US010802190B2

(12) United States Patent
Alexander et al.

(10) Patent No.: US 10,802,190 B2
(45) Date of Patent: Oct. 13, 2020

(54) SYSTEMS, DEVICES, AND METHODS FOR CURVED HOLOGRAPHIC OPTICAL ELEMENTS

(71) Applicant: Covestro LLC, Pittsburgh, PA (US)

(72) Inventors: Stefan Alexander, Elmira (CA); Vance R. Morrison, Kitchener (CA); Thomas Mahon, Guelph (CA)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 16/046,825

(22) Filed: Jul. 26, 2018

(65) Prior Publication Data

US 2018/0372935 A1   Dec. 27, 2018

Related U.S. Application Data

(63) Continuation-in-part of application No. 15/381,883, filed on Dec. 16, 2016, now abandoned.

(60) Provisional application No. 62/268,892, filed on Dec. 17, 2015.

(51) Int. Cl.
*G02B 5/32* (2006.01)
*G02B 27/09* (2006.01)
*G02B 27/01* (2006.01)

(52) U.S. Cl.
CPC ........... *G02B 5/32* (2013.01); *G02B 27/0172* (2013.01); *G02B 27/0955* (2013.01); *G02B 2027/0174* (2013.01); *G02B 2027/0178* (2013.01)

(58) Field of Classification Search
CPC ............................... G02B 5/32; G02B 27/0103

USPC .............................. 359/15, 34, 630, 8; 345/8
See application file for complete search history.

(56) References Cited

U.S. PATENT DOCUMENTS

| 3,408,133 A | 10/1968 | Lee |
| 3,712,716 A | 1/1973 | Cornsweet et al. |
| 4,874,214 A * | 10/1989 | Cheysson .......... G02B 27/0103 359/15 |

(Continued)

FOREIGN PATENT DOCUMENTS

| JP | 61-198892 A | 9/1986 |
| JP | 10-319240 A | 12/1998 |

(Continued)

OTHER PUBLICATIONS

Amitai, "P-27: A Two-dimensional Aperture Expander for Ultra-Compact, High-Performance Head-Worn Displays," *SID Symposium Digest of Technical Papers*, vol. 36, No. 1 (2005), pp. 360-363.

(Continued)

*Primary Examiner* — Audrey Y Chang
(74) *Attorney, Agent, or Firm* — John E. Mrozinski, Jr.

(57) ABSTRACT

Systems, devices, and methods for making and using curved holographic optical elements ("HOEs") are described. A hologram to apply a first optical power to playback light may be embedded in an internal volume of a curved lens, where the curved lens has a first curvature to apply a second optical power to the playback light and a second curvature opposite the first curvature to define the internal volume of the curved lens. The first optical power may be equal in magnitude and opposite in sign to the second optical power. The curved HOEs described herein are particularly well-suited for use when integrated with a curved eyeglass lens to form the transparent combiner of a virtual retina display.

8 Claims, 14 Drawing Sheets

(56) References Cited

U.S. PATENT DOCUMENTS

| | | | |
|---|---|---|---|
| 4,978,213 A | 12/1990 | El Hage | |
| 5,103,323 A | 4/1992 | Magarinos et al. | |
| 5,231,674 A | 7/1993 | Cleveland et al. | |
| 5,467,104 A | 11/1995 | Furness, III et al. | |
| 5,589,956 A | 12/1996 | Morishima et al. | |
| 5,596,339 A | 1/1997 | Furness, III et al. | |
| 5,742,421 A | 4/1998 | Wells et al. | |
| 5,760,931 A | 6/1998 | Saburi et al. | |
| 6,008,781 A | 12/1999 | Furness, III et al. | |
| 6,027,216 A | 2/2000 | Guyton et al. | |
| 6,139,146 A * | 10/2000 | Zhang | G02B 5/32 351/159.22 |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,353,503 B1 | 3/2002 | Spitzer et al. | |
| 6,377,277 B1 | 4/2002 | Yamamoto | |
| 6,545,778 B2 | 4/2003 | Ono et al. | |
| 6,639,570 B2 | 10/2003 | Furness, III et al. | |
| 6,822,770 B1 * | 11/2004 | Takeyama | G02B 5/32 345/8 |
| 6,972,734 B1 | 12/2005 | Ohshima et al. | |
| 7,473,888 B2 | 1/2009 | Wine et al. | |
| 7,640,007 B2 | 12/2009 | Chen et al. | |
| 7,684,105 B2 | 3/2010 | Lamontagne et al. | |
| 7,747,113 B2 | 6/2010 | Mukawa et al. | |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 7,927,522 B2 | 4/2011 | Hsu | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,355,671 B2 | 1/2013 | Kramer et al. | |
| 8,560,976 B1 | 10/2013 | Kim | |
| 8,634,119 B2 | 1/2014 | Bablumyan et al. | |
| 8,666,212 B1 | 3/2014 | Amirparviz | |
| 8,704,882 B2 | 4/2014 | Turner | |
| 8,922,481 B1 | 12/2014 | Kauffmann et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 9,477,079 B2 | 10/2016 | Bailey et al. | |
| 9,766,449 B2 | 9/2017 | Bailey et al. | |
| 9,989,764 B2 | 6/2018 | Alexander et al. | |
| 2001/0033402 A1 | 10/2001 | Popovich | |
| 2002/0003627 A1 | 1/2002 | Rieder | |
| 2002/0007118 A1 | 1/2002 | Adachi et al. | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2004/0174287 A1 | 9/2004 | Deak | |
| 2005/0012715 A1 | 1/2005 | Ford | |
| 2006/0238707 A1 | 10/2006 | Elvesjo et al. | |
| 2007/0078308 A1 | 4/2007 | Daly | |
| 2007/0132785 A1 | 6/2007 | Ebersole, Jr. et al. | |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 | 3/2010 | Sugiyama et al. | |
| 2010/0142015 A1 | 6/2010 | Kuwahara et al. | |
| 2010/0149073 A1 | 6/2010 | Chaum et al. | |
| 2010/0150415 A1 | 6/2010 | Atkinson et al. | |
| 2010/0239776 A1 | 9/2010 | Yajima et al. | |
| 2012/0002256 A1 | 1/2012 | Lacoste et al. | |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2012/0302289 A1 | 11/2012 | Kang | |
| 2013/0009853 A1 | 1/2013 | Hesselink et al. | |
| 2013/0016292 A1 | 1/2013 | Miao et al. | |
| 2013/0016413 A1 | 1/2013 | Saeedi et al. | |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 | 7/2014 | Yamaguchi | |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |
| 2015/0268821 A1 | 9/2015 | Ramsby et al. | |
| 2015/0325202 A1 | 11/2015 | Lake et al. | |
| 2015/0362734 A1 | 12/2015 | Moser et al. | |
| 2015/0378162 A1 | 12/2015 | Bailey et al. | |
| 2016/0033771 A1 | 2/2016 | Tremblay et al. | |
| 2016/0202081 A1 | 7/2016 | Debieuvre et al. | |
| 2016/0238845 A1 | 8/2016 | Alexander et al. | |
| 2016/0274365 A1 | 9/2016 | Bailey et al. | |
| 2016/0274758 A1 | 9/2016 | Bailey | |
| 2016/0327796 A1 | 11/2016 | Bailey et al. | |
| 2016/0327797 A1 | 11/2016 | Bailey et al. | |
| 2016/0349514 A1 | 12/2016 | Alexander et al. | |
| 2016/0349515 A1 | 12/2016 | Alexander et al. | |
| 2016/0349516 A1 | 12/2016 | Alexander et al. | |
| 2016/0377865 A1 | 12/2016 | Alexander et al. | |
| 2016/0377866 A1 | 12/2016 | Alexander et al. | |
| 2017/0068095 A1 | 3/2017 | Holland et al. | |
| 2017/0097753 A1 | 4/2017 | Bailey et al. | |
| 2017/0115483 A1 | 4/2017 | Aleem et al. | |
| 2017/0153701 A1 | 6/2017 | Mahon et al. | |
| 2017/0205876 A1 | 7/2017 | Vidal et al. | |
| 2017/0212349 A1 | 7/2017 | Bailey et al. | |
| 2017/0219829 A1 | 8/2017 | Bailey | |
| 2017/0299956 A1 | 10/2017 | Holland et al. | |
| 2017/0343796 A1 | 11/2017 | Bailey et al. | |
| 2017/0343797 A1 | 11/2017 | Bailey et al. | |
| 2018/0007255 A1 | 1/2018 | Tang | |

FOREIGN PATENT DOCUMENTS

| | | | |
|---|---|---|---|
| JP | 2013-127489 A | 6/2013 | |
| JP | 2013-160905 A | 8/2013 | |
| KR | 10-2004-0006609 A | 1/2004 | |
| WO | 2014/155288 A2 | 10/2014 | |
| WO | 2015/012775 A1 | 8/2015 | |

OTHER PUBLICATIONS

Ayras et al., "Exit pupil expander with a large field of view based on diffractive optics," *Journal of the SID*, vol. 17, No. 8 (2009), pp. 659-664.

Chellappan et al., "Laser-based display: a review," *Applied Optics*, vol. 49, No. 25 (2010), pp. 79-98.

Cui et al., "Diffraction from angular multiplexing slanted volume hologram gratings," *Optik*, vol. 116 (2005), pp. 118-122.

(56) References Cited

OTHER PUBLICATIONS

Curatu et al., "Dual Purpose Lens for an Eye-tracked Projection Head-Mounted Display," *International Optical Design Conference 2006*, SPIE-OSA, vol. 6342 (2007), pp. 63420X-1-63420X-7.

Curatu et al., "Projection-based head-mounted display with eye-tracking capabilities," *Proc. of SPIE*, vol. 5875 (2005), pp. 58750J-1-58750J-9.

Essex, "Tutorial on Optomechanical Beam Steering Mechanisms," College of Optical Sciences, University of Arizona, 2006, 8 pages.

Fernandez et al., "Optimization of a thick polyvinyl alcohol-acrylamide photopolymer for data storage using a combination of angular and peristrophic holographic multiplexing," *Applied Optics*, vol. 45, No. 29 (2006), pp. 7661-7666.

Hainich et al., "Chapter 10: Near-Eye Displays," in: *Displays—Fundamentals & Applications*, 2011, pp. 439-503.

Hornstein et al., "Maradin's Micro-Mirror—System Level Synchronization Notes," *SID 2012 Digest* (2012), pp. 981-984.

International Search Report and Written Opinion, dated Apr. 25, 2017, for International Application No. PCT/US2016/067246, 10 pages.

International Search Report and Written Opinion, dated Dec. 8, 2016, for International Application No. PCT/US2016/050225, 15 pages.

International Search Report and Written Opinion, dated Jan. 18, 2017, for International Application No. PCT/US2016/054852, 12 pages.

International Search Report and Written Opinion, dated Jun. 8, 2016, for International Application No. PCT/US2016/018293, 17 pages.

International Search Report and Written Opinion, dated Jun. 8, 2016, for International Application No. PCT/US2016/018298, 14 pages.

International Search Report and Written Opinion, dated Jun. 8, 2016, for International Application No. PCT/US2016/018299, 12 pages.

International Search Report and Written Opinion, dated Oct. 13, 2017, for International Application No. PCT/US2017/040323, 16 pages.

International Search Report and Written Opinion, dated Sep. 28, 2017, for International Application No. PCT/US2017/027479, 13 pages.

Itoh et al., "Interaction-free calibration for optical see-through head-mounted displays based on 3D eye localization," *2014 IEEE Symposium on 3D User Interfaces* (3DUI), (2014), pp. 75-82.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Kessler, "Optics of Near to Eye Displays (NEDs)," *Oasis 2013*, Tel Aviv, Israel, Feb. 19, 2013, 37 pages.

Kress et al., "A review of head-mounted displays (HMD) technologies and applications for consumer electronics," *Proc. of SPIE*, vol. 8720 (2013), pp. 87200A-1-87200A-13.

Kress et al., "Diffractive and Holographic Optics as Optical Combiners in Head Mounted Displays," *Proceedings of the 2013 ACM Conference on Pervasive and Ubiquitous Computing Adjunct Publication*, Zurich, Switzerland, Sep. 8-12, 2013, pp. 1479-1482.

Kress, "Optical architectures for see-through wearable displays," *Bay Area—SID Seminar*, Bay Area, Apr. 30, 2014, 156 pages.

Levola, "7.1: Invited Paper: Novel Diffractive Optical Components for Near to Eye Displays," *SID Symposium Digest of Technical Papers*, vol. 37, No. 1 (2006), pp. 64-67.

Liao et al., "The Evolution of MEMS Displays," *IEEE Transcations on Industrial Electronics*, vol. 56, No. 4 (2009), pp. 1057-1065.

Lippert, "Chapter 6: Display Devices: RSD (Retinal Scanning Display)," in: *The Avionics Handbook*, 2001, 8 pages.

Majaranta et al., "Chapter 3: Eye-Tracking and Eye-Based Human-Computer Interaction," in *Advances in Physiological Computing*, 2014, pp. 39-65.

Merriam-Webster, "Radio Frequencies" retrieved from https://www.merriam-webster.com/table/collegiate/radiofre.htm, retrieved on Jul. 12, 2017, 2 pages.

Schowengerdt et al., "Stereoscopic retinal scanning laser display with integrated focus cues for ocular accommodation," *Proc. of SPIE—IS&T Electronic Imaging*, vol. 5291 (2004), pp. 366-376.

Silverman et al., "58.5L: Late-News Paper: Engineering a Retinal Scanning Laser Display with Integrated Accommodative Depth Cues," *SID 03 Digest*, (2003), pp. 1538-1541.

Takatsuka et al., "Retinal projection display using diffractive optical element," *Tenth International Conference on Intelligent Information Hiding and Multimedia Signal Processing*, IEEE, (2014), pp. 403-406.

Urey et al., "Optical performance requirements for MEMS-scanner based microdisplays," *Conf. on MOEMS and Miniaturized Systems*, SPIE, vol. 4178 (2000), pp. 176-185.

Urey, "Diffractive exit-pupil expander for display applications," *Applied Optics*, vol. 40, No. 32 (2001), pp. 5840-5851.

Viirre et al., "The Virtual Retina Display: A New Technology for Virtual Reality and Augmented Vision in Medicine," *Proc. of Medicine Meets Virtual Reality* (1998), pp. 252-257.

\* cited by examiner

SYSTEMS, DEVICES, AND METHODS FOR CURVED HOLOGRAPHIC OPTICAL ELEMENTS

TECHNICAL FIELD

The present systems, devices, and methods generally relate to curved holographic optical elements and particularly relate to methods of producing curved holograms as well as systems and devices that employ curved holograms.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Photopolymer

A photopolymer is material that changes one or more of its physical properties when exposed to light. The changes may be manifested in different ways, including structurally and/or chemically. Photopolymer materials are often used in holography as the film or medium within or upon which a hologram is recorded. For example, a photopolymer film may be controllably exposed/illuminated with a particular interference pattern of light to cause surface relief patterns to form in/on the photopolymer film, the surface relief patterns conforming to the intensity/phase pattern of the illuminating light. A photopolymer film may comprise only photopolymer material itself, or it may comprise photopolymer carried on or between any or all of: a substrate, such as triacetate and/or polyamide and/or polyimide, and/or a fixed or removable protective cover layer. Many examples of photopolymer film are available in the art today, such as Bayfol® HX film from Bayer AG.

Eyeglass Lenses

A typical pair of eyeglasses or sunglasses includes two lenses, a respective one of the lenses positioned in front of each eye of the user when the eyeglasses/sunglasses are worn on the user's head. In some alternative designs, a single elongated lens may be used instead of the two separate lenses, the single elongated lens spanning in front of both eyes of the user when the eyeglasses/sunglasses are worn on the user's head. Throughout the remainder of this specification and the appended claims, the terms "eyeglasses" and "sunglasses" are used substantially interchangeably unless the specific context requires otherwise.

The eyeglass lens is the component that provides the main optical function of a pair of eyeglasses. An eyeglass lens is optically transparent, though may optionally provide a degree of tinting and often (though not necessarily) provides some form of optical power. An eyeglass lens may be formed of glass, or a non-glass (e.g., plastic) material such as polycarbonate, CR-39, Hivex®, or Trivex®.

An eyeglass lens may be a non-prescription lens that transmits light essentially unaffected or provides a generic function (such as magnification) to images that pass therethrough. Alternatively, an eyeglass lens may be a prescription lens (usually user-specific) that compensates for deficiencies in the user's vision by imparting specific optical function(s) to transmitted light. Generally, an eyeglass lens begins as a generic lens (or a lens "blank") and a prescription may optionally be applied by deliberately shaping the curvature on either or both of the outward-facing and/or inward-facing surface of the lens. It is most common for a prescription to be applied by shaping the curvature of the inward-facing surface (i.e., the surface that is most proximate the user's eye when worn) of a lens.

Generally, the vast majority of eyeglass lenses in the art are curved and not planar structures. This curvature is used to impart desired optical properties on light passing therethrough and also enables more natural and better-fitting aesthetic designs for eyeglass frames compared to flat planar lens geometries.

BRIEF SUMMARY

A method of producing a curved holographic optical element ("HOE") that comprises at least one hologram recorded in a holographic film, wherein the curved HOE has a total optical power $P_T$, may be summarized as including: positioning and orienting the holographic film in a planar geometry; optically recording a hologram in the holographic film while the holographic film is in the planar geometry, wherein the hologram has a holographic optical power $P_H$ that is less than the total optical power $P_T$ of the curved HOE; and applying a curvature to the holographic film, wherein applying the curvature to the holographic film includes applying a geometric optical power $P_G$ to the holographic film, the geometric optical power $P_G$ less than the total optical power $P_T$ of the curved HOE, and wherein the total optical power $P_T$ of the curved HOE includes an additive combination of the holographic optical power $P_H$ and the geometric optical power $P_G$ given, at least approximately, by $P_T = P_H + P_G$. Positioning and orienting the holographic film in a planar geometry may include mounting the holographic film on a planar surface. Optically recording a hologram in the holographic film while the holographic film is in the planar geometry may include optically recording the hologram in the holographic film while the holographic film is mounted on the planar surface. The method may further include removing the holographic film from the planar surface before applying the curvature to the holographic film.

Applying a curvature to the holographic film may include at least one of: mounting the holographic film on a curved surface or embedding the holographic film within a curved volume. Optically recording a hologram in the holographic film while the holographic film is in the planar geometry may include optically recording the hologram in the holographic film with a first laser having a first wavelength while the holographic film is in the planar geometry, the first wavelength different from a playback wavelength of the curved HOE. Applying a curvature to the holographic film may include stretching the holographic film, and optically recording the hologram in the holographic film with a first laser having a first wavelength while the holographic film is in the planar geometry may include optically recording the hologram in the holographic film with the first laser having a first wavelength that is less than the playback wavelength of the curved HOE. Alternatively, applying a curvature to the holographic film may include compressing the holographic film, and optically recording the hologram in the holographic film with a first laser having a first wavelength while the holographic film is in the planar geometry may include optically recording the hologram in the holographic film with the first laser having a first wavelength that is greater than the playback wavelength of the curved HOE.

Optically recording a hologram in the holographic film while the holographic film is in the planar geometry may include optically recording the hologram in the holographic film with a first laser at a first incidence angle while the holographic film is in the planar geometry, the first incidence angle different from a playback incidence angle of the curved HOE.

The total optical power $P_T$ of the curved HOE may be positive with a total focal length $f_T$. Optically recording a hologram in the holographic film while the holographic film is positioned and oriented in the planar geometry may include optically recording a hologram having a positive holographic optical power $P_H$ and a first focal length $f_H$ that is greater than the total focal length $f_T$ of the curved HOE. Applying a curvature to the holographic film may include applying a positive geometric optical power $P_G$ having a second focal length $f_G$ to the holographic film, the second focal length $f_G$ greater than the total focal length $f_T$ of the curved HOE, wherein the total focal length $f_T$ of the curved HOE includes an additive reciprocal combination of the first focal length $f_H$ and the second focal length $f_G$ given, at least approximately, by $1/f_T=1/f_H+1/f_G$.

A curved HOE having a total optical power $P_T$ may be summarized as including: at least one curved layer of holographic film that includes at least one hologram, wherein: the at least one hologram has a holographic optical power $P_H$ that is less than the total optical power $P_T$ of the curved HOE; and the at least one curved layer of holographic film has a geometric optical power $P_G$ that is less than the total optical power $P_T$ of the curved HOE, and wherein the total optical power $P_T$ of the curved HOE includes an additive combination of the holographic optical power $P_H$ of the at least one hologram and the geometric optical power $P_G$ of the at least one curved layer of holographic film given, at least approximately, by $P_T=P_H+P_G$. The total optical power $P_T$ of the curved HOE may be positive and include a total focal length $f_T$. The holographic optical power $P_H$ of the at least one hologram may be positive and have a first focal length $f_H$ that is greater than the total focal length $f_T$ of the curved HOE. The geometric optical power $P_G$ of the at least one curved layer of holographic film may be positive and have a second focal length $f_G$ that is greater than the total focal length $f_T$ of the curved HOE, wherein the total focal length $f_T$ of the curved HOE includes an additive reciprocal combination of the first focal length $f_H$ and the second focal length $f_G$ given, at least approximately, by $1/f_T=1/f_H+1/f_G$.

A method of producing a curved HOE that comprises at least one hologram recorded in a holographic film may be summarized as including: positioning and orienting the holographic film in a planar geometry; optically recording a hologram in the holographic film with a first laser having a first wavelength while the holographic film is in the planar geometry, the first wavelength different from a playback wavelength of the curved HOE; and applying a curvature to the holographic film. Applying a curvature to the holographic film may include stretching the holographic film, and optically recording the hologram in the holographic film with a first laser having a first wavelength while the holographic film is in the planar geometry may include optically recording the hologram in the holographic film with the first laser having a first wavelength that is less than the playback wavelength of the curved HOE. Alternatively, applying a curvature to the holographic film may include compressing the holographic film, and optically recording the hologram in the holographic film with a first laser having a first wavelength while the holographic film is in the planar geometry may include optically recording the hologram in the holographic film with the first laser having a first wavelength that is greater than the playback wavelength of the curved HOE.

Optically recording a hologram in the holographic film while the holographic film is in the planar geometry may include optically recording the hologram with a holographic optical power $P_H$ that is less than a total optical power $P_T$ of the curved HOE while the holographic film is in the planar geometry. Applying a curvature to the holographic film may include applying a geometric optical power $P_G$ that is less than the total optical power $P_T$ of the curved HOE to the holographic film, and the total optical power $P_T$ of the curved HOE may include an additive combination of the holographic optical power $P_H$ and the geometric optical power $P_G$ given, at least approximately, by $P_T=P_H+P_G$.

Positioning and orienting the holographic film in a planar geometry may include mounting the holographic film on a planar surface. Optically recording a hologram in the holographic film with a first laser having a first wavelength while the holographic film is in the planar geometry may include optically recording the hologram in the holographic film with the first laser having the first wavelength while the holographic film is mounted on the planar surface. The method may further include removing the holographic film from the planar surface before applying the curvature to the holographic film. Applying a curvature to the holographic film may include at least one of: mounting the holographic film on a curved surface or embedding the holographic film within a curved volume.

A method of producing a HOE that comprises at least one hologram recorded in a holographic film may be summarized as including: providing a first layer of holographic film in a planar geometry; stretching the first layer of holographic film; optically recording a hologram in the first layer of holographic film while the first layer of holographic film is stretched; and returning the first layer of holographic film to an unstretched state. Stretching the first layer of holographic film may include mounting the first layer of holographic film onto a curved surface. The method may further include at least one of: mounting the first layer of holographic film on a curved surface for playback; or embedding the first layer of holographic film within a curved volume for playback. Mounting the first layer of holographic film on a curved surface for playback may include stretching the first layer of holographic film in the direction normal to a plane of the first layer of holographic film onto the curved surface.

The method may further include: providing a second layer of holographic film in a planar geometry; replicating the hologram from the first layer of holographic film in the second layer of holographic film while both the first layer of holographic film and the second layer of holographic film are each in respective unstretched states; and at least one of: mounting the second layer of holographic film on a curved surface for playback or embedding the second layer of holographic film within a curved volume for playback. Mounting the second layer of holographic film on a curved surface for playback may include stretching the second layer of holographic film in a direction normal to a plane of the second layer of holographic film onto the curved surface.

A method of producing a curved HOE may be summarized as including: mounting a holographic film on a first surface, the first surface being transparent and having a first curvature; and optically recording a hologram in the holographic film while the holographic film is mounted on the first surface. The method may further include: removing the holographic film from the first surface; and at least one of: mounting the holographic film on a second surface for playback, the second surface having a second curvature substantially equal to the first curvature; or embedding the holographic film within a curved volume for playback, the curved volume having a second curvature substantially equal to the first curvature.

A method of replicating a curved HOE that comprises at least one hologram recorded in a holographic film may be summarized as including: providing a first layer of holographic film; mounting the first layer of holographic film on a first surface, the first surface having a first curvature; optically recording a hologram in the first layer of holographic film while the first layer of holographic film is mounted on the first surface; providing a second layer of holographic film; applying the first curvature to the second layer of holographic film; and replicating the hologram from the first layer of holographic film in the second layer of holographic film while both the first layer of holographic film and the second layer of holographic film each have the first curvature.

A curved holographic optical element (HOE) for use in a wearable heads-up display may be summarized as including: at least one hologram to apply a first optical power to a playback light; a curved lens, wherein the curved lens may include: a target-side surface having a first curvature, the first curvature to apply a second optical power to the playback light; and a world-side surface having a second curvature, the world-side surface opposite the target-side surface across a thickness of the curved lens to define an internal volume of the curved lens; wherein the at least one hologram may be embedded within the internal volume of the curved lens, and wherein the first optical power may be equal in magnitude and opposite in sign to the second optical power.

The first optical power may include a first holographic optical power; the at least one hologram may include at least one hologram to apply a first holographic optical power to a diffracted playback light; the second optical power may include a first refractive optical power; and the first curvature may include a first curvature to apply a first refractive optical power to the diffracted playback light. The at least one hologram may include: a respective incident playback angle; a respective playback angle; and a respective playback wavelength; wherein the at least one hologram diffracts a respective diffracted playback light towards a target area at a respective playback angle when each hologram is illuminated with a respective incident playback light with a respective incident playback angle and a respective playback wavelength.

The first curvature may include a first curvature to apply a second refractive optical power to an incident playback light; and the at least one hologram may include at least one hologram to apply a second holographic optical power to the incident playback light, wherein the second holographic optical power is equal in magnitude and opposite in sign to the second refractive optical power. A combination of the first curvature and the second curvature may not apply a net optical power to environmental light passing through the HOE to a target area. The target-side surface may include a first spherically curved surface, the world-side surface may include a second spherically curved surface, and the first spherically curved surface and the second spherically curved surface may comprise a set of concentrically spherically curved surfaces.

The first curvature may not be equal to the second curvature, and a combination of the first curvature and the second curvature may apply a net optical power to environmental light passing through the HOE to a target area. The first optical power may be negative and the second optical power may be positive. The curved HOE may include a curved light guide, wherein the at least one hologram may include a holographic outcoupler, and wherein the curved light guide may be optically coupled to the holographic outcoupler to route playback light through the light guide to the holographic outcoupler. The holographic outcoupler may include a first exit pupil replicator positioned and oriented to replicate a first set of exit pupils, wherein each exit pupil of the first set of exit pupils may be replicated into a respective first subset of at least two exit pupils, each first subset of exit pupils may be oriented in a first dimension, and wherein the first set of exit pupils may include at least one exit pupil.

The curved HOE of claim 10 may include a second exit pupil replicator positioned and oriented to replicate a second set of exit pupils, wherein each exit pupil of the second set of exit pupils is replicated into a respective second subset of at least two exit pupils, each second subset of exit pupils is oriented in a second dimension, and wherein the second set of exit pupils may include at least one exit pupil.

The first curvature may apply a second refractive optical power to an incident playback light; and the curved HOE may include a holographic incoupler, the holographic incoupler may include at least one hologram to apply a second holographic optical power to the incident playback light, wherein the second holographic optical power is equal in magnitude and opposite in sign to the second refractive optical power. The curved lens may include an eyeglass lens and a target area may include an eye of a user. The curved lens may include a prescription eyeglass lens. The hologram may include an infrared hologram.

The target-side surface may have an aspheric curvature, the first optical power may vary across the target-side surface, and the second optical power may vary across the hologram to achieve a second optical power across the hologram that is equal in magnitude and opposite in sign to the first optical power across the hologram. The hologram film may include a red hologram, a green hologram, and a blue hologram.

A wearable heads-up display (WHUD) may be summarized as including: a support structure; a projector; and a curved holographic optical element (HOE) positioned and oriented to appear in a field of view of an eye of a user when the support structure is worn on a head of the user, the curved HOE comprising: at least one hologram to apply a first optical power to a playback light; a curved lens, wherein the curved lens may include: a target-side surface having a first curvature, the first curvature to apply a second optical power to the playback light; and a world-side surface having a second curvature, the world-side surface opposite the target-side surface across a thickness of the curved lens to define an internal volume of the curved lens; wherein the at least one hologram may be embedded within the internal volume of the curved lens, and wherein the first optical power may be equal in magnitude and opposite in sign to the second optical power.

The first optical power may include a first holographic optical power; the at least one hologram may include at least one hologram to apply a first holographic optical power to a diffracted playback light; the second optical power may include a first refractive optical power; and the first curvature may include a first curvature to apply a first refractive optical power to the diffracted playback light. The at least one hologram may include: a respective incident playback angle; a respective playback angle; and a respective playback wavelength; wherein the at least one hologram diffracts a respective diffracted playback light towards a target area at a respective playback angle when each hologram is illuminated with a respective incident playback light with a respective incident playback angle and a respective playback wavelength.

The first curvature may include a first curvature to apply a second refractive optical power to an incident playback light; and the at least one hologram may include at least one hologram to apply a second holographic optical power to the incident playback light, wherein the second holographic optical power may be equal in magnitude and opposite in sign to the second refractive optical power. A combination of the first curvature and the second curvature may not apply a net optical power to environmental light passing through the HOE to a target area.

The first curvature may not be equal to the second curvature, and a combination of the first curvature and the second curvature may apply a net optical power to environmental light passing through the HOE to a target area. The first optical power may be negative and the second optical power may be positive. The WHUD may include a curved light guide, wherein the at least one hologram may include a holographic outcoupler, and wherein the curved light guide may be optically coupled to the holographic outcoupler to route playback light through the light guide to the holographic outcoupler.

The holographic outcoupler may include a first exit pupil replicator positioned and oriented to replicate a first set of exit pupils, wherein each exit pupil of the first set of exit pupils may be replicated into a respective first subset of at least two exit pupils, each first subset of exit pupils may be oriented in a first dimension, and wherein the first set of exit pupils may include at least one exit pupil. The WHUD may include a second exit pupil replicator positioned and oriented to replicate a second set of exit pupils, wherein each exit pupil of the second set of exit pupils may be replicated into a respective second subset of at least two exit pupils, each second subset of exit pupils may be oriented in a second dimension, and wherein the second set of exit pupils may include at least one exit pupil.

The first curvature may apply a second refractive optical power to an incident playback light; and wherein the WHUD may include a holographic incoupler, wherein the holographic incoupler may include at least one hologram to apply a second holographic optical power to the incident playback light, wherein the second holographic optical power may be equal in magnitude and opposite in sign to the second refractive optical power.

The curved lens may include an eyeglass lens and a target area may include an eye of a user. The curved lens may include a prescription eyeglass lens. The hologram may include an infrared hologram. The target-side surface may have an aspheric curvature, the first optical power may vary across the target-side surface, and the holographic optical power may vary across the hologram to achieve a holographic optical power across the hologram that is equal in magnitude and opposite in sign to the first optical power across the hologram. The hologram film may include a red hologram, a green hologram, and a blue hologram.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
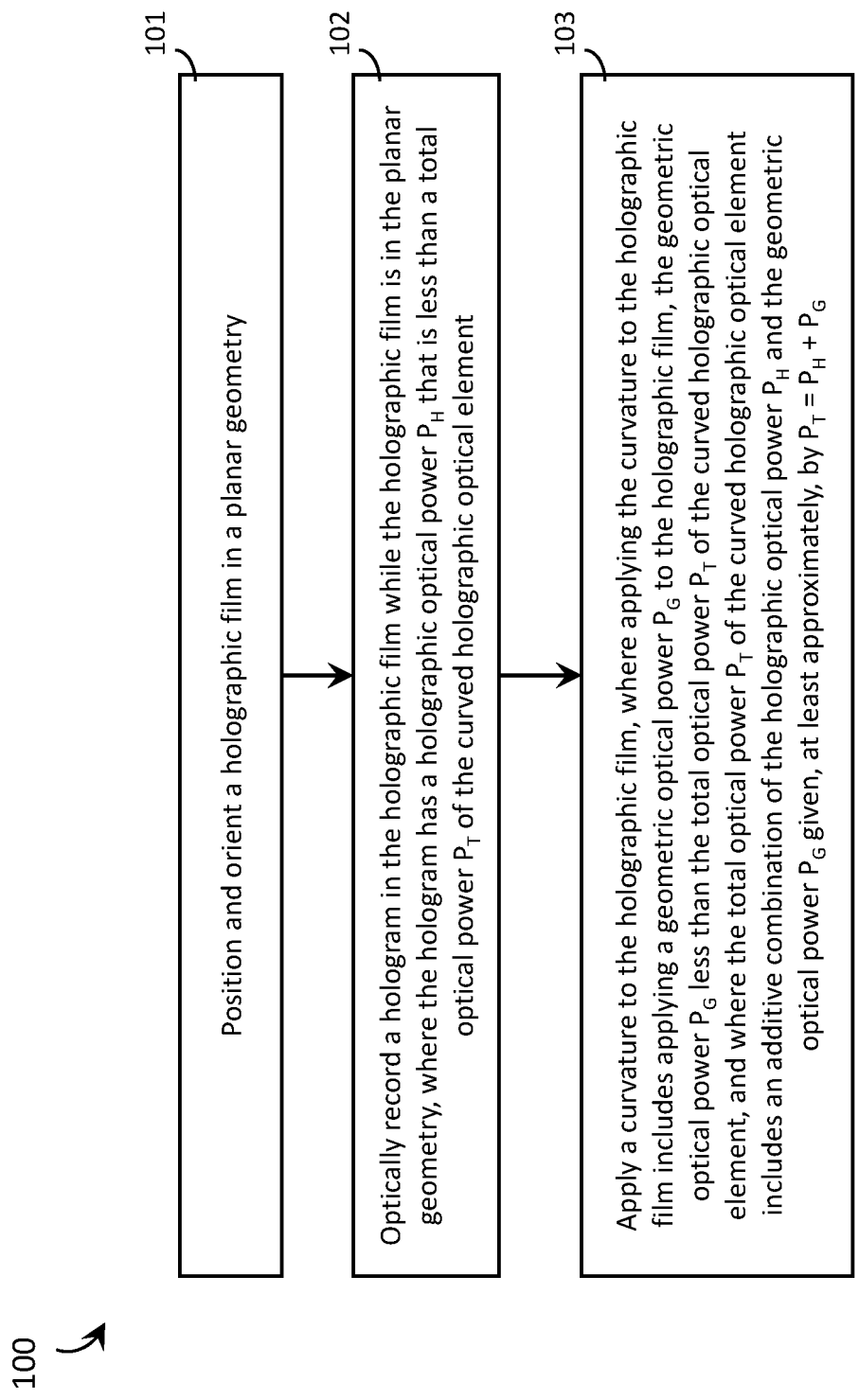
FIG. 1 is a flow-diagram showing an exemplary method of producing a curved holographic optical element ("HOE") that has a total optical power and comprises at least one hologram recorded in a holographic film in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with head-mounted displays and electronic devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for curved holographic optical elements ("HOEs"). In the art, HOEs are generally recorded and played back in a planar configuration. However, certain applications (e.g., the virtual retina display ("VRD") architectures described in U.S. Provisional Patent Application Ser. No. 62/242,844 (now U.S. Non-Provisional patent application Ser. No. 15/147,638), U.S. Provisional Patent Application Ser. No. 62/156,736 (now U.S. Non-Provisional patent application Ser. No. 15/145,576, US Patent Application Publication No. 2016-0327797, and US Patent Application Publication No. 2016-0327796), and/or U.S. Provisional Patent Application Ser. No. 62/117,316 (now U.S. Non-Provisional patent application Ser. No. 15/046,234, U.S. Non-Provisional patent application Ser. No. 15/046,254, and US Patent Application Publication No. 2016-0238845)), are better-suited to the use of curved HOEs. The various embodiments described herein provide processes for optically recording and, in some cases, replicating HOEs that are designed to be played back in a curved geometry. The various embodiments described herein also provide curved HOEs that have been prepared by such processes.

A conventional HOE is recorded on a planar surface and maintained in a planar configuration for playback. U.S. Provisional Patent Application Ser. No. 62/214,600 (now U.S. Non-Provisional patent application Ser. No. 15/256,148) describes systems, devices, and methods for the physical integration of a HOE with a curved eyeglass lens in order to produce the transparent combiner of a VRD architecture that has an eyeglasses form factor, such as the VRD architectures described above. The physical integration of a planar HOE with a curved eyeglass lens can, in some implementations, result in a curvature being applied to the HOE itself. This curvature can impact the optical characteristics and playback performance of the HOE. There is a need in the art for HOEs, and methods of making HOEs, that can perform in designed ways when mounted on or within curved surfaces.

Throughout this specification and the appended claims, the term HOE is generally used to describe a structure that embodies, encodes, or otherwise includes at least one hologram recorded, embedded, integrated, or otherwise included therein and/or thereon. A single HOE may include one or multiple layer(s) of holographic film (such as silver halide or a photopolymer film such as Bayfol® HX film from Bayer AG) carrying one or multiple hologram(s). A person of skill in the art will appreciate that an HOE may also include one or more layer(s) of other material(s), such as a hard coating, an anti-reflective coating, an adhesive layer, and so on.

Throughout this specification and the appended claims, the term "playback" (and variants such as "played back") is generally used to refer to the process of viewing, activating, or otherwise optically using a HOE after recording. Similarly, the term "playback light" is generally used to refer to light that is used to activate or view the hologram during playback (as distinct from, for example, "recording light," which is light that is used to record the hologram).

Throughout this specification and the appended claims, various references are made to "curved holograms/HOEs" and "holograms/HOEs that are designed to be played back in a curved geometry." Generally, a layer of holographic film has two faces (a front face and a rear face) each having the same area separated from one another by a thickness (which may or may not be constant along any give dimension, e.g., length or width), and a curved hologram/HOE is one that has a physical curvature over its area (or faces) such that the area (or faces) of the holographic film is (or are) not flat or planar. In other words, if a face of a planar holographic film forms a plane in the x- and y-dimensions (i.e., an xy-plane), then curvature will give the face a varying z-dimension as well. The curvature may be homogeneous, such as cylindrical or spherical, or it may be heterogeneous. A curved hologram/HOE may be designed to be played back in a curved geometry, but a hologram/HOE that is designed to be played back in a curved geometry need not necessarily be curved at all times. For example, some embodiments described herein provide holograms/HOEs that are recorded in a planar geometry but are designed to account for effects that will arise when a curvature is subsequently applied to the hologram/HOE and the hologram/HOE is played back while curved. Such a hologram/HOE is characterized herein as a hologram/HOE that is "designed to be played back in a curved geometry" but may exist in a planar state during recording and for some time afterwards, until a curvature is applied to thereto, at which point it becomes a "curved hologram/HOE."

FIG. 1 is a flow-diagram showing an exemplary method 100 of producing a curved HOE that has a total optical power and comprises at least one hologram recorded in a holographic film in accordance with the present systems, devices, and methods. Method 100 includes three acts 101, 102, and 103, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 101, at least one layer of holographic film is positioned and oriented in a planar geometry. This may be accomplished by, for example, mounting the at least one layer of holographic film on a planar surface, which may include laminating, adhering, gluing, or otherwise applying the holographic film (e.g., using mechanical fixtures to hold the holographic film in place) to the planar surface with any number (including zero) of intermediate layers. The planar surface may advantageously be optically transparent and, if one or more intermediate layer(s) is/are included, such layer(s) should advantageously also be optically transparent. As an example, the planar surface may be an optically clear substrate (e.g., plastic or glass) suitable for use in optical recording of holograms. Being mounted on a planar surface, the holographic film is necessarily in a planar geometry. As alternatives to mounting the holographic film on a planar substrate, the holographic film may be positioned and oriented in a planar geometry by, for example, hanging or suspending the holographic film. In some implementations, the holographic film may already exist in a planar geometry, in which case mounting to a planar surface may not be required.

At 102, a hologram is optically recorded in the holographic film while the holographic film is in the planar geometry (e.g., while the holographic film is mounted on a planar surface). The hologram has a holographic optical power that is less than the total optical power of the curved HOE. In other words, the hologram may be designed so that during playback the hologram may apply an optical function (given by the holographic optical power) to playback light and cause the playback light to focus to a point at a first focal length. Whether the point to which the holographic optical power causes the playback light to focus is in front of or behind the hologram depends on the design of the hologram (i.e., whether the optical power is positive or negative). Throughout this specification and the appended claims, the term "holographic optical power" is generally used to refer to an optical power or optical function imparted on incident light by the interference pattern of a hologram during playback.

At 103, a curvature is applied to the holographic film resulting in a curved holographic film. By applying the curvature to the holographic film, a geometric optical power that is less than the total optical power of the curved HOE is applied to the holographic film. In other words, applying a curvature to the holographic film imparts a "geometric optical power" on the holographic film that is independent of the hologram recorded in the film. During playback, this geometric optical power may cause the playback light to focus to a point at a second focal length. Whether the point to which the geometric optical power causes the playback light to focus is in front of or behind the holographic film depends on the direction of curvature of the holographic film. Throughout this specification and the appended claims, the term "geometric optical power" is generally used to refer to an optical power or an optical function imparted on incident light by the geometry of a holographic film. For the purposes of the present systems, devices, and methods, holographic optical power and geometric optical power are two distinct and independent optical functions that may be imparted on incident light during playback of a curved HOE; however a person of skill in the art will appreciate that, in the case of an otherwise transparent holographic film, at least one hologram may need to be present in the holographic film to influence the incident playback light and cause the geometric optical power to have any effect.

A total optical power ($P_T$) of the curved HOE includes an additive combination of the holographic optical power ($P_H$) and the geometric optical power ($P_G$) given, at least approximately, by:

$$P_T = P_H + P_G$$

While the combination of the holographic optical power $P_H$ and geometric optical power $P_G$ towards the total optical power $P_T$ is generally additive as shown above, the phrase "at least approximately" is used to allow for other, additional contributing factors (e.g., a refractive index, if applicable) that may influence the total optical power $P_T$ of the curved HOE (e.g., $P_T = P_H + P_G + x$, where x is a catch-all optical power representing the influence of all other potential contributing factors). Quantitatively, the phrase "at least approximately" should generally be interpreted herein as "within plus or minus 10% of the stated value."

Similarly, the total focal length ($f_T = 1/P_T$) of the curved HOE includes an additive reciprocal combination of the first focal length associated with the holographic optical power ($f_H = 1/P_H$) and the second focal length associated with the geometric optical power ($f_G = 1/P_G$) given, at least approximately, by:

$$\frac{1}{f_T} = \frac{1}{f_H} + \frac{1}{f_G}$$

In the same way as for the combination of the optical powers, the combination of the first focal length $f_H$ and the second focal length $f_G$ towards the total focal length $f_T$ is generally additive reciprocal, but the phrase "at least approximately" is used to all for other, additional contributing factors that may influence the total focal length $f_T$ (e.g., the convergence/divergence/collimation of the incident playback light).

Applying a curvature to the holographic film at 103 may or may not include mounting the holographic film on a curved surface (such as, for example, integrating the HOE with a curved eyeglass lens as described in U.S. Provisional Patent Application Ser. No. 62/214,600, now U.S. Non-Provisional patent application Ser. No. 15/256,148) or embedding the holographic film within a curved volume. Generally, throughout this specification and the appended claims the phrase "mounting on a surface" (and variants, such as "mounted on a surface") is used loosely to refer to any integration between the holographic film and a surface. As examples, "mounting on a surface" may include, without limitation: laminating, adhering, gluing, or otherwise applying the holographic film to the surface or supporting of the holographic film by the surface whether adhered to or not.

As an alternative to applying curvature to a holographic film by mounting it on a curved surface, a holographic film may be embedded within a curved volume (as also described in U.S. Provisional Patent Application Ser. No. 62/214,600, now U.S. Non-Provisional patent application Ser. No. 15/256,148). In this case, curvature may be applied to the holographic film as part of the embedding process, or the holographic film may be formed to embody a curvature (e.g., using known techniques for film shaping, such as gas flow, a pressure differential on opposite sides of the film, and the like) prior to being embedded in the curved volume. The embedding itself may employ a casting or injection molding process.

In implementations in which act 101 involves mounting the holographic film to a planar surface, method 100 may further include (in between acts 102 and 103), removing the holographic film from the planar surface. Removing the holographic film from the planar surface may include delaminating, decoupling, or generally disengaging the holographic film from the planar surface.

In conventional hologram design, a hologram is designed to be played back in a planar geometry and geometric optical power is not a design element. In accordance with the present systems, devices, and methods, a HOE that is recorded in a planar geometry (e.g., at 102) but intended for playback in a curved geometry may be designed to compensate for the geometric optical power that will be added to the total optical power of the HOE when the curvature is applied to the HOE (e.g., at 103). For example, if it is desired that an HOE have a total optical power of X when played back in a curved geometry, the HOE may be recorded with a holographic optical power of Y (where Y≠X) to compensate for the geometric contribution to the total optical power that will be applied when the HOE is curved. The holographic optical power of a hologram may be controlled by, among other things, varying a distance between either or both of the sources of laser light used to record the hologram from the holographic film itself. More specifically, for planar playback the hologram may be recorded with the holographic film in a planar geometry and with the two lasers used to record the hologram (e.g., the illumination or object beam and the reference beam) each positioned at a respective point (i.e., a respective "construction point") $p_1$ and $p_2$, where construction point $p_1$ is separated from the holographic film by a first distance $d_1$ and construction point $p_2$ is separated from the holographic film by a second distance $d_2$. This will result in a holographic optical power of $P_H$. In order to adapt such a hologram for use in a curved geometry (i.e., in order to account for the geometric optical power $P_G$ that will be introduced if the hologram is subsequently used in a curved geometry), the construction points $p_1$ and $p_2$ may be moved in order to increase/decrease the distances $d_1$ and $d_2$ and thereby decrease/increase the holographic optical power $P_H$ such that the additive combination of the holographic optical power $P_H$ and the geometric optical power $P_G$ gives the desired total optical power $P_T$ when the hologram is played back in a curved geometry.

Figure 2:
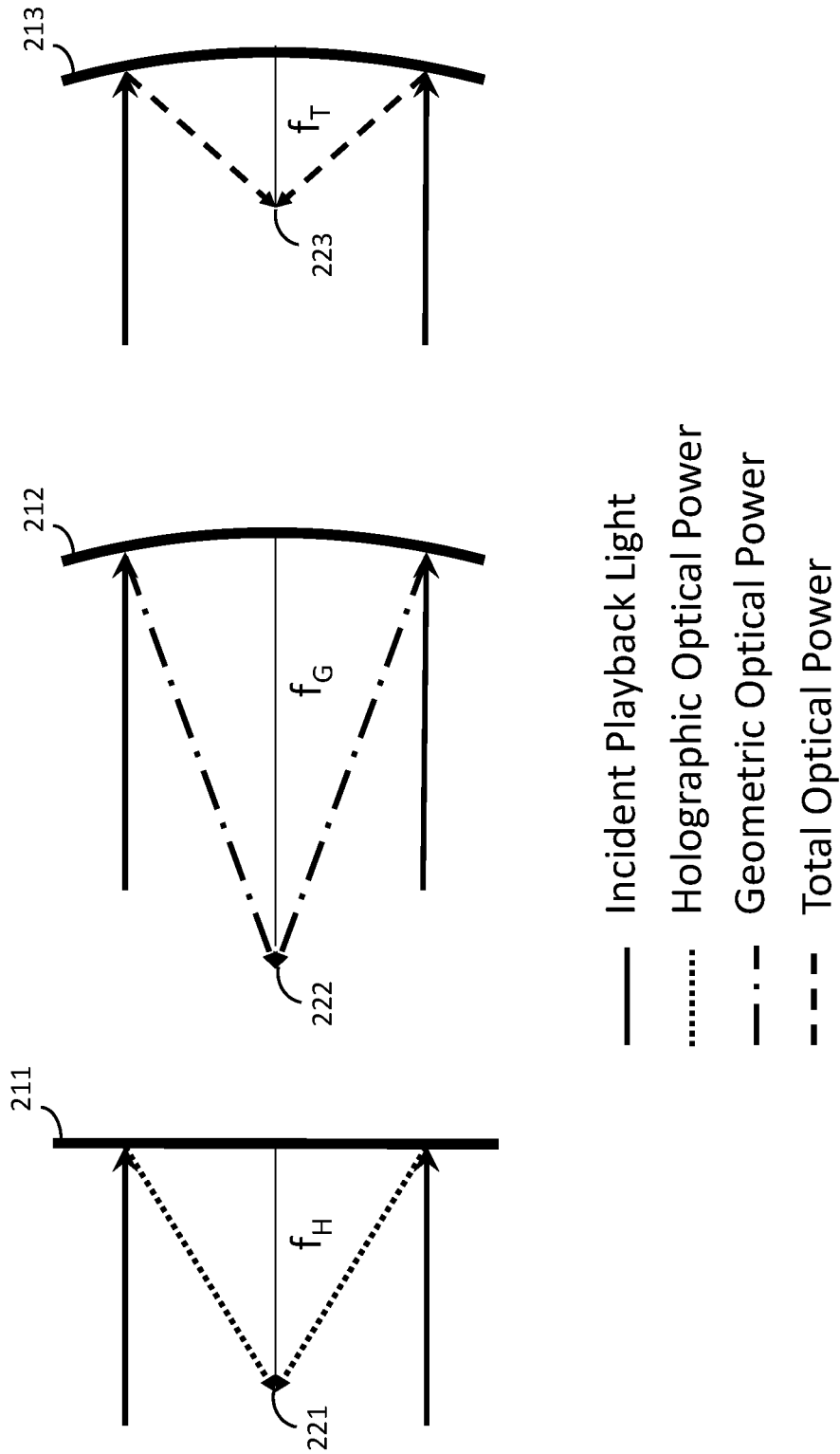
FIG. 2 is an illustrative diagram showing the difference between holographic optical power and geometric optical power, and how the two combine to produce total optical power in accordance with the present systems, devices, and methods.

FIG. 2 is an illustrative diagram showing the difference between holographic optical power and geometric optical power, and how the two combine to produce total optical power in accordance with the present systems, devices, and methods. For the purpose of comparison, FIG. 2 includes an illustration of a planar HOE 211, a curved piece of holographic film 212 with a hologram designed to act like a simple mirror, and a curved HOE 213 that corresponds to planar HOE 211 with the curvature of film 212 applied thereto.

Planar HOE 211 includes a hologram having a holographic optical power that functions like a converging mirror to reflect and converge light during playback. Incident playback light impinging on planar HOE 211 is shown converging to a first focal point 221 at a first focal length $f_H$ in front of planar HOE 211, and this convergence is solely due to holographic optical power.

For exemplary purposes, curved piece of holographic film 212 includes a hologram that simply reflects incident playback light. In other words, if curved holographic film 212 was not curved, but instead was planar, then curved holographic film 212 would behave like a plane mirror. Curved piece of holographic film 212 has a concave curvature with respect to the incident playback light. Accordingly, curved film 212 has a geometric optical power and incident playback light impinging thereon is shown converging to a second focal point 222 at a second focal length $f_G$ in front of curved film 212. This convergence is solely due to geometric optical power.

Curved HOE 213 represents planar HOE 211 after the curvature of film 212 has been applied thereto. In other words, curved HOE 213 represents a curved HOE prepared by a process comprising acts 101, 102, and 103 of method 100. Curved HOE 213 comprises at least one curved layer of holographic film that has a total optical power given by an additive combination of the holographic optical power of planar HOE 211 and the geometric optical power of curved film 212. Accordingly, incident playback light that impinges on curved HOE 213 converges to a third focal point 223 at a third focal length (i.e., the total focal length) $f_T$ in front of curved HOE 213, where the total focal length $f_T$ of curved HOE 213 (i.e., the third focal length) is given by an additive reciprocal combination of the first focal length $f_H$ of planar HOE 211 and the second focal length $f_G$ of curved film 212.

Returning to FIG. 1 and method 100, optically recording a hologram in the holographic film while the holographic film is in the planar geometry at 102 may include optically recording the hologram in the holographic film with a first laser having a first wavelength while the holographic film is in the planar geometry. The first wavelength may be deliberately different from a desired playback wavelength of the curved HOE in order to compensate for changes that may occur to the geometry and/or spacing of the interference pattern that encodes the hologram when curvature is applied to the holographic film at 103.

For example, applying curvature to the holographic film at 103 may include stretching the holographic film which may cause an increase in the spacing between at least some of the elements of the interference pattern that encodes the hologram. During playback, a hologram is generally responsive to (i.e., active for) a narrow range of wavelengths of incident playback light (i.e., the "playback wavelength"), particularly the range of wavelengths that are equal to and within a range of the size of the spacing between elements in the interference pattern that encodes the hologram. An increase in the spacing between elements of the interference pattern that encodes the hologram may cause the hologram to become responsive to/active for a range of playback light wavelengths that differs from the range of wavelengths used to record the hologram. In accordance with the present systems, devices, and methods, if a hologram is recorded in a planar geometry but it is known that a curvature is subsequently going to be applied to the holographic film by stretching the hologram, then the hologram may be recorded in the planar geometry using a first wavelength of laser light that is deliberately less than the intended playback wavelength in order to compensate for the increase in the spacing between the elements of the interference pattern that will result when the holographic film is stretched.

Similarly, applying curvature to the holographic film at 103 may include compressing, scrunching, squeezing, or otherwise constricting the holographic film. For example, applying a curvature to the holographic film may involve heating the holographic film and this heating may cause the holographic film to shrink. Throughout this specification and the appended claims, the term "compress" (and variants such as "compressing" and "compression") is generally used to refer to all means by which the holographic film may reduce in size when curvature is applied. Such compression may cause a decrease in the spacing between at least some of the elements of the interference pattern that encodes the hologram. In accordance with the present systems, devices, and methods, if a hologram is recorded in a planar geometry but it is known that a curvature is subsequently going to be applied to the holographic film by compressing the hologram, then the hologram may be recorded using a first wavelength of laser light that is deliberately greater than the intended playback wavelength in order to compensate for the decrease in the spacing between the elements of the interference pattern that will result when the holographic film is compressed.

Figure 3:
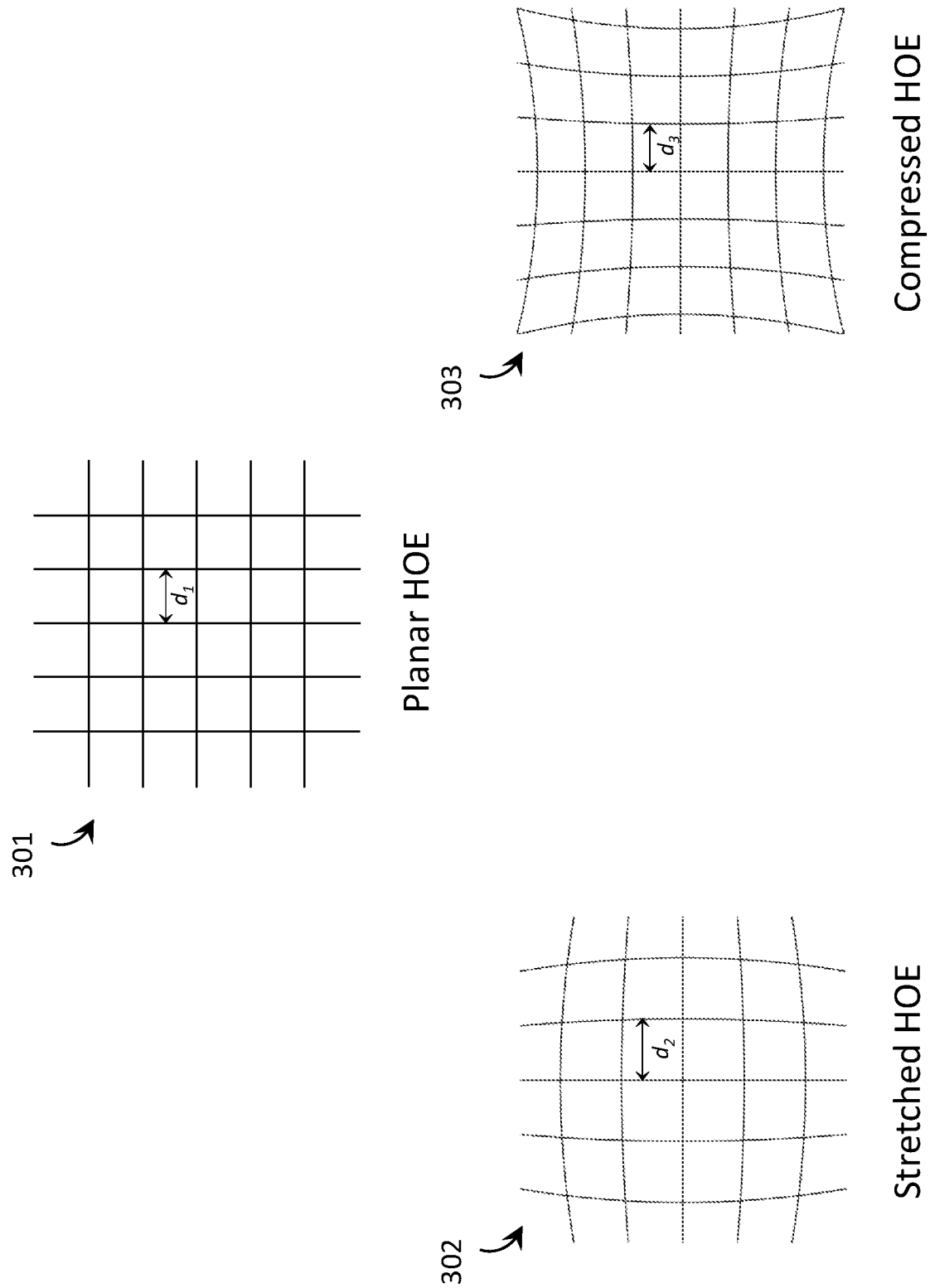
FIG. 3 is an illustrative diagram showing exemplary effects on the spacing between elements of the interference pattern that encodes a hologram when a curvature is applied to the corresponding holographic film by i) stretching and ii) compressing the holographic film in accordance with the present systems, devices, and methods.

FIG. 3 is an illustrative diagram showing exemplary effects on the spacing between elements of the interference pattern that encodes a hologram when a curvature is applied to the corresponding holographic film by i) stretching and ii) compressing the holographic film in accordance with the present systems, devices, and methods. For the purpose of comparison, FIG. 3 includes an illustration of a planar HOE 301 in its planar geometry alongside the same planar HOE with a curve applied by stretching (i.e., stretched HOE 302) and the same HOE with a curve applied by compressing (i.e., compressed HOE 303). In each illustration, the interference pattern that encodes the hologram is represented by a simple grid for ease of illustration.

For planar HOE 301, the interference pattern is a simple right-angle grid with uniform spacing $d_1$ in between elements. Accordingly, planar HOE 301 will playback as desired for playback light having a wavelength of $\sim d_1$, which is substantially equal to the wavelength of the laser light used to record planar HOE 301.

For stretched HOE 302, the same holographic film from planar HOE 301 has a curvature applied (per 103 of method 100; i.e., after recording the hologram in a planar geometry) by stretching the holographic film (e.g., stretching the holographic film onto or against a curved surface, either concave or convex, or using other known techniques for film shaping such as a pressure differential across the film as a membrane). This stretching causes an increase in the spacing between at least some elements of the interference pattern from $d_1$ to $d_2$, where $d_2$ is greater than $d_1$. Accordingly, stretched HOE 302 will play back as desired for playback light having a wavelength $\sim d_2 > d_1$, which is greater than the wavelength of the laser light used to record planar HOE 301. In accordance with the present systems, devices, and methods, the hologram in stretched HOE 302 may be optically recorded while the holographic film is in a planar geometry using laser light having a wavelength that is less than the wavelength of the light that will be used for playback when stretched HOE 302 is stretched, in order to compensate for the increase in spacing from $d_1$ to $d_2$ between interference pattern elements that may result when the holographic film is stretched.

For compressed HOE 303, the same holographic film from planar HOE 301 has a curvature applied (per 103 of method 100; i.e., after recording the hologram in a planar geometry) by compressing or otherwise constricting the holographic film (e.g., squashing the holographic film onto or against a curved surface, either concave or convex). This compressing causes a decrease in the spacing between at least some elements of the interference pattern from $d_1$ to $d_3$, where $d_3$ is less than $d_1$. Accordingly, compressed HOE 303 will playback as desired for playback light having a wavelength $\sim d_3 < d_1$, which is less than the wavelength of the laser light used to record planar HOE 301. In accordance with the present systems, devices, and methods, the hologram in compressed HOE 303 may be optically recorded while the holographic film is in a planar geometry using laser light having a wavelength that is greater than the wavelength of the light that will be used for playback when compressed HOE 303 is compressed, in order to compensate for the decrease in spacing from $d_1$ to $d_3$ between interference pattern elements that may result when the holographic film is compressed.

Figure 4:
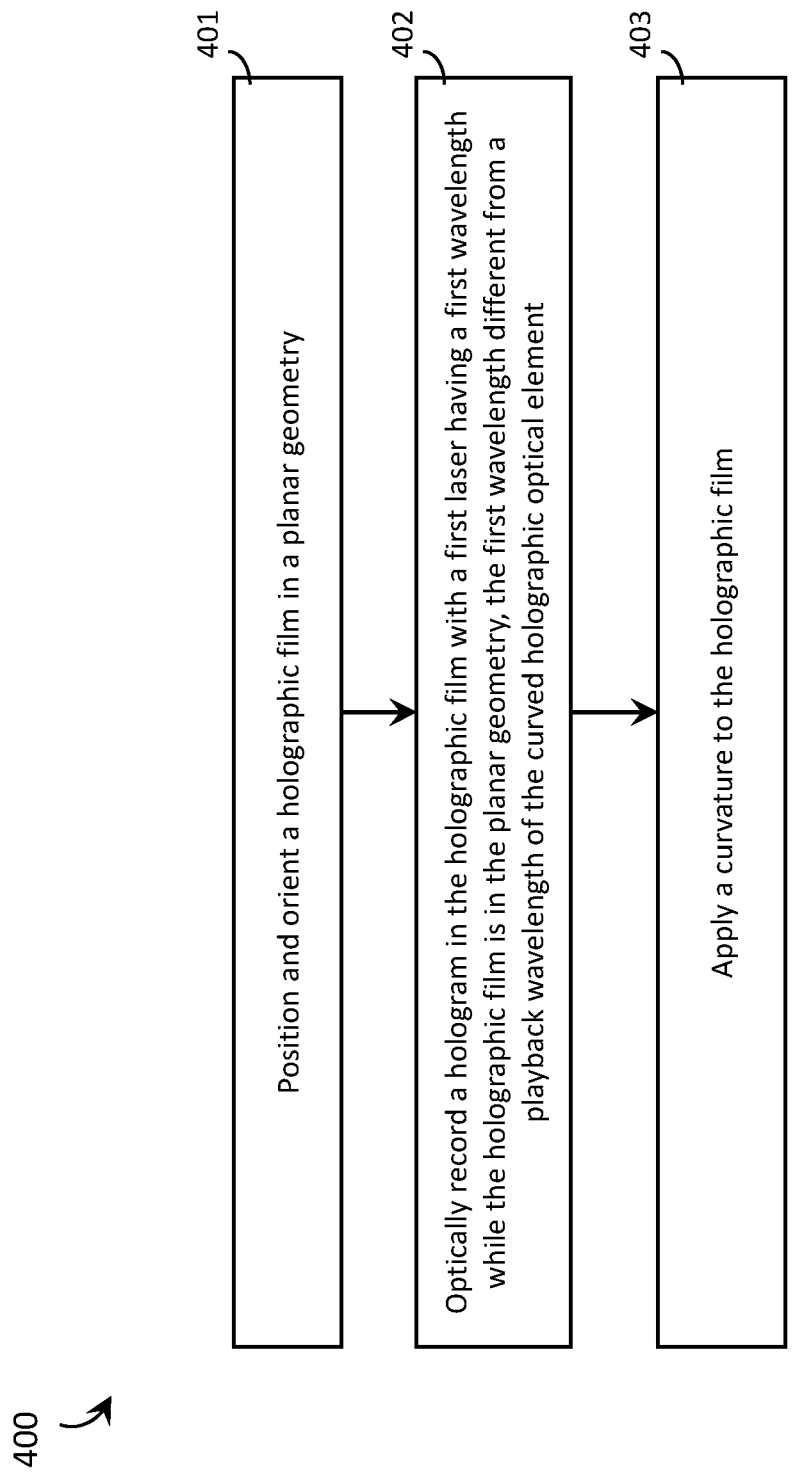
FIG. 4 is a flow-diagram showing an exemplary method of producing a curved HOE that comprises at least one hologram recorded in a holographic film in accordance with the present systems, devices, and methods.

FIG. 4 is a flow-diagram showing an exemplary method 400 of producing a curved HOE that comprises at least one hologram recorded in a holographic film in accordance with the present systems, devices, and methods. Method 400 includes three acts 401, 402, and 403, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 401, at least one layer of holographic film is positioned and oriented in a planar geometry in a substantially similar way to that described at 101 of method 100. For example, the at least one layer of holographic film may be mounted on a planar surface. The planar surface may be an optically transparent substrate (e.g., plastic or glass) suitable for use in optical recording of holograms. Being mounted on a planar surface, the holographic film is necessarily in a planar geometry.

At 402, a hologram is optically recorded in the holographic film while the holographic film is in the planar geometry. A first laser having a first wavelength (i.e., a first narrow band range of wavelengths) is used to optically record the hologram while the holographic film is in the planar geometry, and this first wavelength is deliberately different from an intended playback wavelength of the curved HOE. As described previously, the difference between the first wavelength of the recording laser and the playback wavelength is designed to compensate for physical changes to the spacing between elements of the interference pattern that defines the hologram when the holographic film is subsequently curved via stretching or compression.

At 403, a curvature is applied to the holographic film. Applying the curvature includes stretching or compressing the hologram and thereby causing a change in the spacing between at least some elements of the interference pattern that defines the hologram optically recorded at 402 while the holographic film was in a planar geometry. As described previously, when applying curvature to the holographic film includes stretching the holographic film then the first wavelength of laser light used to optically record the hologram at 402 may be less than the intended playback wavelength of the curved HOE in order to compensate for an increase in the spacing between elements of the hologram interference pattern caused by the stretching. As also described previously, when applying curvature to the holographic film includes compressing the holographic film then the first wavelength of laser light used to optically record the hologram at 402 may be greater than the intended playback wavelength of the curved HOE in order to compensate for a decrease in the spacing between elements of the hologram interference pattern caused by the compression.

As in method 100, optically recording a hologram in the holographic film at 402 may include optically recording the hologram with a holographic optical power and a first focal length while the holographic film is in the planar geometry. Furthermore, applying the curvature to the holographic film at 403 may include applying a geometric optical power with a second focal length to the holographic film. As before, the holographic optical power and the geometric optical power may both be less than the total optical power of the curved HOE. The total optical power of the curved HOE may include an additive combination of the holographic optical power and the geometric optical power while a total focal length of the curved HOE may include an additive reciprocal combination of the first focal length and the second focal length.

Wavelength is an example of a property of recording laser light that can influence the spacing between elements in the interference pattern that encodes, embodies, or otherwise represents a hologram in holographic film. Another example of such a property is the angle of incidence of the recording laser light. How exactly the angle of incidence of the recording light can influence (e.g., compensate for subsequent changes resulting from stretching/shrinking the holographic film) the spacing between elements in the interference pattern depends a lot on the specific implementation. For example, for a fixed wavelength of recording light, the spacing between elements in the interference pattern of a hologram may, in some implementations, increase as the angle of incidence of the recording light moves away from normal. Thus, if applying a curvature to a holographic film is going to involve stretching the holographic film, a steeper (i.e., closer to normal) angle of incidence for the recording light may be used while the holographic film is in a planar geometry, compared to what would be used if the hologram was intended to be played back without applying curvature. The steeper angle of incidence for the recording light may produce a smaller distance between elements in the interference pattern, but the subsequent stretching when the curvature is applied may further separate such elements to ultimately produce the desired spacing for playback while curved. Likewise, if applying a curvature to a holographic film is going to involve compressing the holographic film, a flatter (i.e., further from normal) angle of incidence for the recording light may be used while the holographic film is in a planar geometry, compared to what would be used if the hologram was intended to be played back without applying curvature. The flatter angle of incidence for the recording light may produce a larger distance between elements in the interference pattern, but the subsequent compressing when the curvature is applied may bring such elements closer together to ultimately produce the desired spacing for playback while curved. This relationship (record closer to normal to accommodate stretching, further from normal to accommodate shrinkage) can be implementation-specific and a person of skill in the art of holography will appreciate that different implementations (e.g., different recording set ups and hologram properties) may different relationships. However, returning to method 100, in general optically recording a hologram in the holographic film while the holographic film is in the planar geometry per 102 may include optically recording the hologram in the holographic film with a first laser at a first incidence angle while the holographic film is in the planar geometry, the first incidence angle different from a playback incidence angle of the curved HOE.

Methods 100 and 400 each produce a curved HOE by optically recording a hologram into holographic film while the holographic film is in a planar geometry and then subsequently applying a curvature to the holographic film. Because the curvature is applied after recording the hologram, methods 100 and 400 provide various methods of compensating (e.g., convergence compensation, wavelength compensation) for effects that the applied curvature will have on the initially planar hologram. Furthermore, physically deforming the holographic film once a hologram is recorded therein/thereon (i.e., in applying curvature to the holographic film at 103/403) can adversely affect the interference pattern of the hologram (and thereby adversely affect the playback performance of the hologram). In order to mitigate such effects, it may be advantageous to ensure that curvature is applied to the holographic film (i.e., at 103/403) very gently and/or slowly and to control other factors such as temperature and pressure. In some implementations, it can be advantageous to cool the holographic film after optical recording of the hologram (i.e., after 102/402) but before (and/or during) applying curvature to the holographic film (i.e., at 103/403) in order to at least partially "freeze" the interference pattern in place in the holographic film and reduce physical deformations thereof. In other implementations, it can be advantageous to heat the holographic film after optical recording of the hologram (i.e., after 102/402) but before (and/or during) applying curvature to the holographic film (i.e., at 103/403) in order to at least partially increase the malleability of the holographic film and the interference pattern therein/thereon prior to applying physical deformations thereto.

In accordance with the present systems, devices, and methods, an alternative to methods 100 and 400 is to optically record the hologram while the holographic film is already in a curved configuration.

Figure 5:
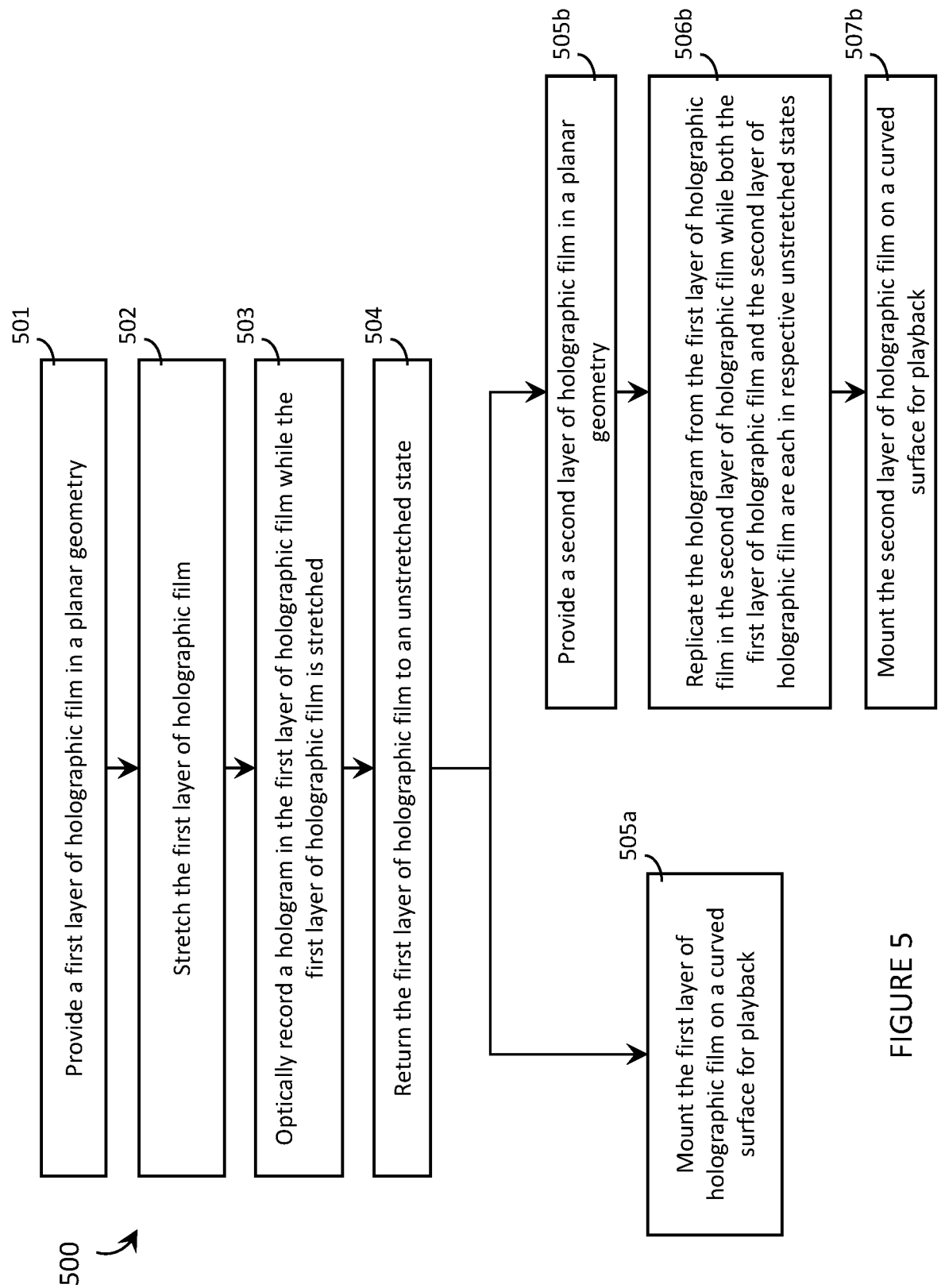
FIG. 5 is a flow-diagram showing an exemplary method of producing a HOE that comprises at least one hologram recorded in a holographic film in accordance with the present systems, devices, and methods.

FIG. 5 is a flow-diagram showing an exemplary method 500 of producing a HOE that comprises at least one hologram recorded in a holographic film in accordance with the present systems, devices, and methods. Method 500 includes four basic acts 501, 502, 503, and 504 and then a branch to two different scenarios depending on the implementation. Scenario A comprises one act 505*a* in addition to acts 501, 502, 503, and 504 while scenario B comprises three acts 505*b*, 506*b*, and 507*b* in addition to acts 501, 502, 503, and 504. Those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 501, a first layer of holographic film is provided in a planar geometry. The holographic film is unrecorded and advantageously not exposed to light in order to prevent unwanted impressions in the film.

At 502, the first layer of holographic film is stretched. Stretching the first layer of holographic film may include applying a curvature to the holographic film such that it is no longer planar, which may include mounting the first layer of holographic film onto a curved transparent surface. Mounting the first layer of holographic film onto a curved transparent surface may employ similar techniques to act 101 of method 100 and/or act 401 of method 400 (where the holographic film is mounted on a planar transparent surface) with the obvious distinction that the transparent surface is curved in method 500 whereas the transparent surface is planar in methods 100 and 400. Alternatively, stretching the first layer of holographic film may include applying a curvature to the first layer of holographic film by using various techniques for film forming/shaping, such as by positioning the first layer of holographic film as a membrane across a pressure differential.

At 503, a hologram is optically recorded in the first layer of holographic film while the first layer of holographic film is in the stretched state of 502. Depending on the nature of the hologram, optically recording the hologram in the first layer of holographic film while the first layer of holographic film is in the stretched state (i.e., while the first layer of holographic film is curved) may require compensating for an optical effect of a curved transparent surface upon which the holographic film is mounted if the holographic film is mounted on a curved transparent surface.

At 504, the first layer of holographic film is returned to an unstretched state. Returning the first layer of holographic film to the unstretched state may include relaxing or otherwise removing the stretching force applied at 502. If the holographic film is mounted on a curved transparent surface at 502 then returning the first layer of holographic film to the unstretched state at 504 may include removing (e.g., delaminating) the holographic film from the curved transparent surface. As described previously, once a hologram with an associated interference pattern is recorded in/on a holographic film, it can be advantageous to cool/heat (depending on the implementation) the holographic film prior to applying physical deformations thereto (i.e., returning from the stretched state of 502 and 503 to an unstretched state at 504) in order to mitigate any damage such physical deformations may inflict on the interference pattern of the hologram.

After act 504, the HOE is in an unstretched, planar geometry but carries a hologram that was recorded while the HOE was in a stretched and/or curved geometry. That is, the HOE is planar and unstretched but the hologram is designed to be played back while the HOE is curved and stretched. From 504 method 500 proceeds in one of two directions depending on whether the first layer of holographic film will be played back itself (scenario A) or the first layer of holographic film will be used as a master to produce one or more copies using hologram replication techniques (scenario B).

When the first layer of holographic film will be played back itself (scenario A), method 500 proceeds from act 504 to act 505a.

At 505a, the first layer of holographic film is mounted on a curved surface for playback or embedded within a curved volume for playback. The curved surface/volume may be whatever curved surface/volume upon or within which the HOE is intended to be used in its curved geometry. As an example, the curved surface/volume may be a surface/volume of an eyeglass lens in a VRD architecture as described previously. If the curved surface is a surface of an eyeglass lens, the curved surface may be an inner surface (typically concave in curvature) or an outer surface (typically convex in curvature) of the eyeglass lens. Mounting the first layer of holographic film on the curved surface and/or embedding the first layer of holographic film within the curved volume may include, for example, techniques described in U.S. Provisional Patent Application Ser. No. 62/214,600 (now U.S. Non-Provisional patent application Ser. No. 15/256,148). Mounting the first layer of holographic film on the curved surface or embedding the first layer of holographic material within the curved volume may include stretching the first layer of holographic film in the direction normal to the plane of the first layer of holographic film onto the curved surface or within the curved volume in order to produce substantially the same geometry that was previously produced at 502 of method 500 and used during optical recording of the hologram at 503.

When the first layer of holographic film will be used as a master to produce one or more copies using hologram replication techniques (scenario B), method 500 proceeds from act 504 to acts 505b, 506b, and 507b.

At 505b, a second layer of holographic film is provided in a planar geometry. The second layer of holographic film is unrecorded and advantageously not exposed to light in order to prevent unwanted impressions in the film.

At 506b (which retains the "b" label even though there is no corresponding "506a" in order to clarify that a "$506^{th}$ act" is only performed in scenario B), the hologram from the first layer of holographic film is replicated in the second layer of holographic film while both the first layer of holographic film and the second layer of holographic film are in respective unstretched states. This replication is completed using established techniques for replicating either surface relief holograms or volumetric holograms depending on the nature of the hologram. Generally, the first layer of holographic film and the second layer of holographic film are pressed together and the hologram from the first layer of holographic film is either physically/mechanically embossed, debossed, stamped, or otherwise impressed into the second layer of holographic film and/or the hologram in the first layer of holographic film may function like a mask and substantially the same interference pattern may be optically recorded into the second layer of holographic film through the first layer of holographic film.

At 507b (which likewise retains the "b" label even though there is no corresponding "507a" in order to clarify that a "$507^{th}$ act" is only performed in scenario B), the second layer of holographic film is mounted on a curved surface or embedded in a curved volume for playback in a substantially similar way to that described for the first layer of holographic film at 505a under scenario A of method 500.

When the first layer of holographic film is used as a master to produce one or more copies using hologram replication techniques under scenario B of method 500, the first layer of holographic film may be used to produce any number of copies (i.e., any number of "second layers of holographic film") via hologram replication techniques.

Figure 6:
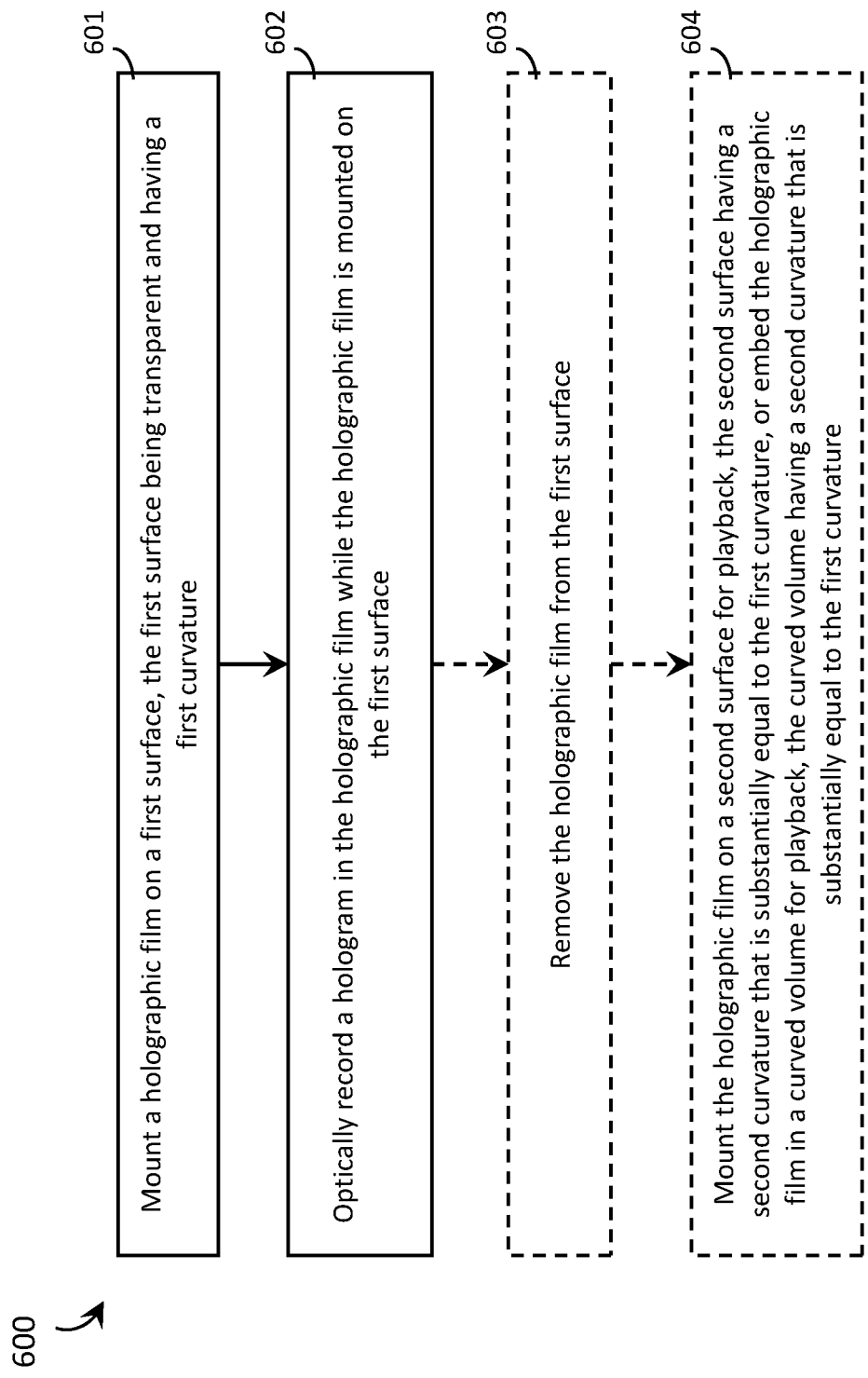
FIG. 6 is a flow-diagram showing an exemplary method of producing a curved HOE in accordance with the present systems, devices, and methods.

FIG. 6 is a flow-diagram showing an exemplary method 600 of producing a curved HOE in accordance with the present systems, devices, and methods. Method 600 includes two basic acts 601 and 602 and two optional acts 603 and 604, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 601, a holographic film is mounted on a first surface, the first surface being transparent and having a first curvature. The first curvature may be concave or convex depending on the particular implementation. The holographic film may be mounted on the first surface using any of a variety of different techniques, including without limitation: lamination, adhesion, gluing, mechanical support fixtures, static, friction, an interference fit, pressure points, stretching, compressing/constricting/squashing, and so on. Act 601 of method 600 may, in some implementations, be substantially similar to act 502 of method 500.

At 602, a hologram is optically recorded in the holographic film while the holographic film is mounted on the first surface. In other words, a hologram is optically recorded in the holographic film while the holographic film is curved. As described previously, optically recording a hologram through a curved transparent surface may require that any optical effects of the curved transparent surface (e.g., lensing effects, refraction effects, and so on) be taken into account and compensated for in the recording light pattern(s). Optically recording a curved hologram can also significantly impact the range of angles from which the recording light is incident (and likewise from which the playback light will be incident); thus, it is advantageous to ensure that the resulting hologram has sufficient angular bandwidth to accommodate this potentially wider range of incident angles. The hologram bandwidth can be controlled, at least in part, with the material properties of the holographic film. For example, a thinner layer of holographic film generally has a wider angular bandwidth than a thicker layer of holographic film. Act 602 of method 600 may, in some implementations, be substantially similar to act 503 of method 500.

In some implementations, the first surface upon which the holographic film is mounted at 601 and upon which the hologram is optically recorded in the holographic film at 602 may be the surface upon which the HOE is ultimately used during playback. For example, if the HOE is for use on a curved eyeglass lens in the VRD architecture described previously, then the first surface upon which the holographic film is mounted at 601 may be a surface of the eyeglass lens itself. That is, at 601 the holographic film may be mounted on a surface of an eyeglass lens and at 602 a hologram may be optically recorded in the holographic film while the holographic film is mounted on the surface of the eyeglass lens. In such implementation, method 600 concludes after act 602.

In other implementations, the first surface upon which the holographic film is mounted at 601 and upon which the hologram is optically recorded in the holographic film at 602 may be a temporary surface used only for the optical recording phase at 602. In such implementations, method 600 proceeds from act 602 to acts 603 and 604.

At 603, the holographic film is removed from the first surface. In some implementations, it may be advantageous to enhance the rigidity of the holographic film before it is removed from the first surface in order to facilitate preservation of the first curvature in the hologram. The rigidity may be enhanced by, for example: cooling the holographic film prior to removal from the first surface and/or applying a hardening agent to the holographic film and curing/setting this hardening agent before removing the holographic film from the first surface. In other implementations, the holographic film may return to a substantially planar configuration when removed from the first surface at 603.

At 604, the holographic film is mounted on a second surface or embedded within a curved volume for playback, the second surface/curved volume having a second curvature that is substantially equal to the first curvature. The holographic film may be mounted on the second surface at 604 in a substantially similar way to how the holographic film is mounted on the first surface at 601, with the noted distinction that (in implementations when method 600 proceeds beyond act 602 to acts 603 and 604) at 601 the holographic film is mounted temporarily on the first surface and at 604 the holographic film is mounted permanently on the second surface. Hardening or otherwise increasing the rigidity of the holographic film before removal from the first surface at 603 may advantageously facilitate mounting the holographic film on the second surface or embedding the holographic film within a curved volume at 604. The second surface upon, or the curved surface within, which the holographic film is mounted/embedded at 604 may be the surface/volume upon/within which the HOE is ultimately used during playback. For example, if the HOE is for use on or within a curved eyeglass lens in the VRD architecture described previously, then the second surface upon, or curved volume within, which the holographic film is mounted/embedded at 604 may be a surface/volume of an eyeglass lens.

Figure 7:
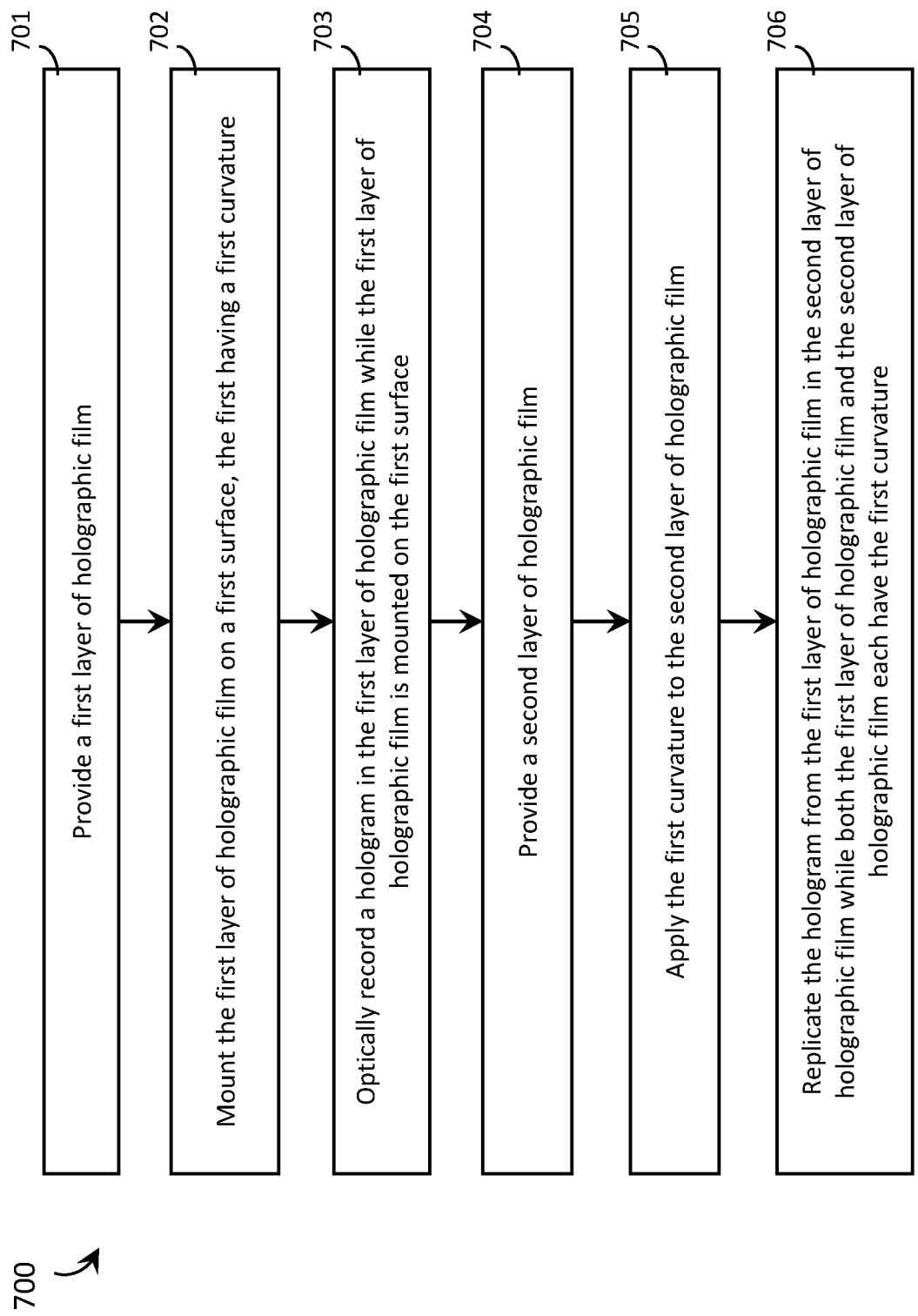
FIG. 7 is a flow-diagram showing an exemplary method of replicating a curved HOE that comprises at least one hologram recorded in a holographic film in accordance with the present systems, devices, and methods.

FIG. 7 is a flow-diagram showing an exemplary method 700 of replicating a curved HOE that comprises at least one hologram recorded in a holographic film in accordance with the present systems, devices, and methods. Method 700 includes six acts 701, 702, 703, 704, 705, and 706, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 701, a first layer of holographic film is provided. The first layer of holographic film is unrecorded and advantageously not exposed to light in order to prevent unwanted impressions in the film.

At 702, the first layer of holographic film is mounted on a first surface, the first surface being transparent and having a first curvature. Act 702 of method 700 may be substantially similar to act 601 of method 600 and/or act 502 of method 500.

At 703, a hologram is optically recorded in the first layer of holographic film while the first layer of holographic film is mounted on the first surface. That is, a hologram is optically recorded in the first layer of holographic film while the first layer of holographic film is mounted on a transparent curved surface. Act 703 of method 700 may be substantially similar to act 602 of method 600 and/or act 503 of method 500.

At 704, a second layer of holographic film is provided. The second layer of holographic film is unrecorded and advantageously not exposed to light in order to prevent unwanted impressions in the film.

At 705, the first curvature (i.e., the curvature of the first surface upon which the first layer of holographic film is mounted) is applied to the second layer of holographic film. The first curvature may be applied to the second layer of holographic film by, for example: mounting the second layer of holographic film on a second surface that has a curvature substantially similar to the first curvature; by mounting the second layer of holographic film on or under the first layer of holographic film either on the first surface or on a second surface of the same structure that includes the first surface, the second surface opposite the first surface on the same structure; or by embedding the second layer of holographic film within a curved volume that has a curvature substantially similar to the first curvature. In some implementations, the first layer of holographic film may be removed from the first surface in a way substantially similar to that described at 603 of method 600 and the first layer of holographic film and second layer of holographic film may be combined on a surface or structure that retains the first curvature.

At 706, the hologram from the first layer of holographic film is replicated in the second layer of holographic film while both the first layer of holographic film and the second layer of holographic film each have the first curvature. That is, the techniques for holographic replication that are typically employed using planar layers of holographic film are adapted for use with two substantially similarly curved layers of holographic film. The replication may use a mechanical/physical stamping/embossing/debossing/impressing process to physically copy the features of the hologram from the first layer of holographic film into the second layer of holographic film while both the first layer of holographic film and the second layer of holographic film exhibit the first curvature, in which case the conventionally-planar hologram replication process may be adapted to employ a curved press/stamp having the first curvature and/or a mating curved "bowl and press" (e.g., mortar and pestle) combination having mating concave and convex versions of the first curvature. The replication may use optical recording in which the first layer of holographic film over/underlies the second layer of holographic film and the hologram in the first layer of holographic serves as an optical mask for recording the same interference pattern into the second layer of holographic film.

FIGS. 1, 3, 4, 5, 6, and 7 all describe various processes (100, 300, 400, 500, 600, and 700, respectively) of producing curved HOE products, any or all of which may be used, as an example, in the VRD architecture described previously. Generally, the processes for making/replicating curved HOEs described herein may produce curved HOE products and, accordingly, the scope of the present systems, devices, and methods includes curved HOE products that are prepared by processes comprising the acts of the various methods (e.g., method 100, method 400, method 500, method 600, and/or method 700) described herein.

Figure 8:
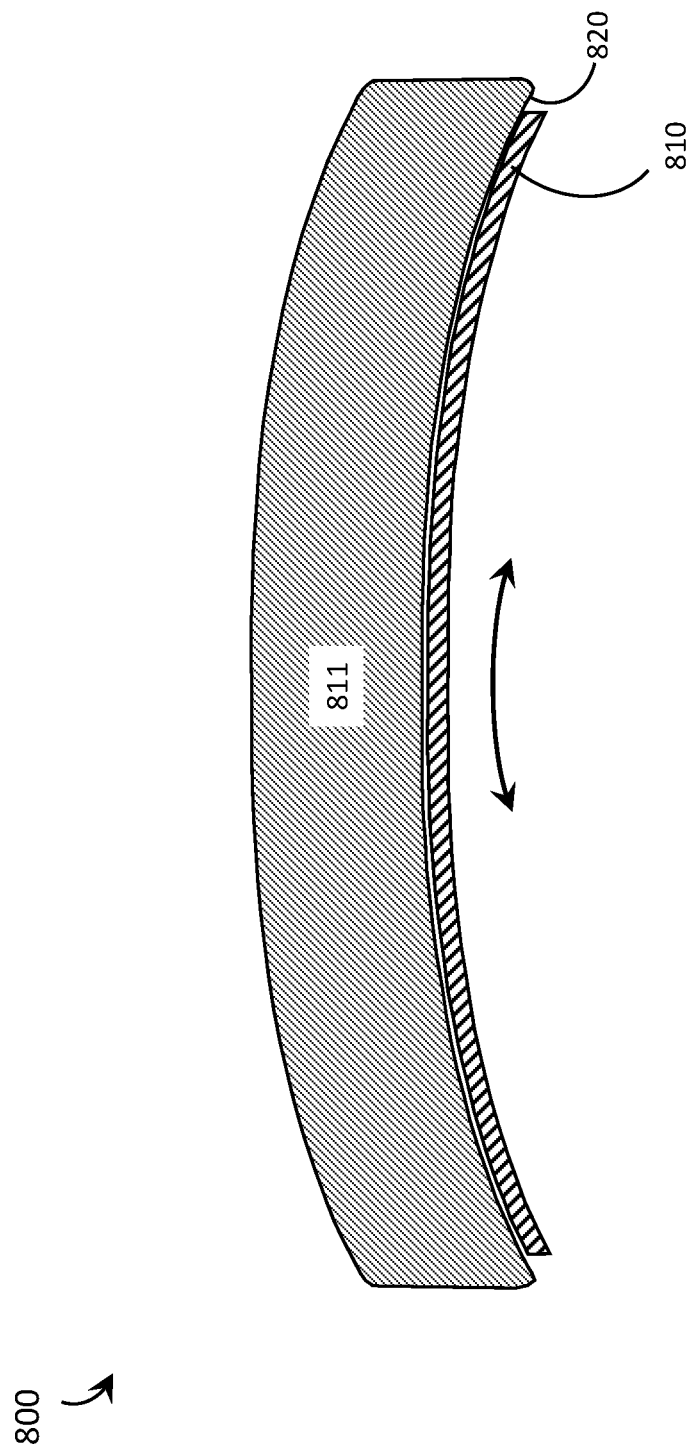
FIG. 8 is a sectional view of an exemplary curved HOE in accordance with the present systems, devices, and methods.

FIG. 8 is a sectional view of an exemplary curved HOE 800 in accordance with the present systems, devices, and methods. Curved HOE 800 includes a layer of holographic film 810 mounted on a transparent curved surface 820 (having a first curvature emphasized by the arrows in FIG. 8) of a transparent substrate 811 and may be prepared by any of method 100, 300, 400, 500, 600, and/or 700. In the illustrated example, substrate 811 is an eyeglass lens and curved HOE 800 forms a transparent combiner for use in a VRD architecture as described previously.

Figure 9:
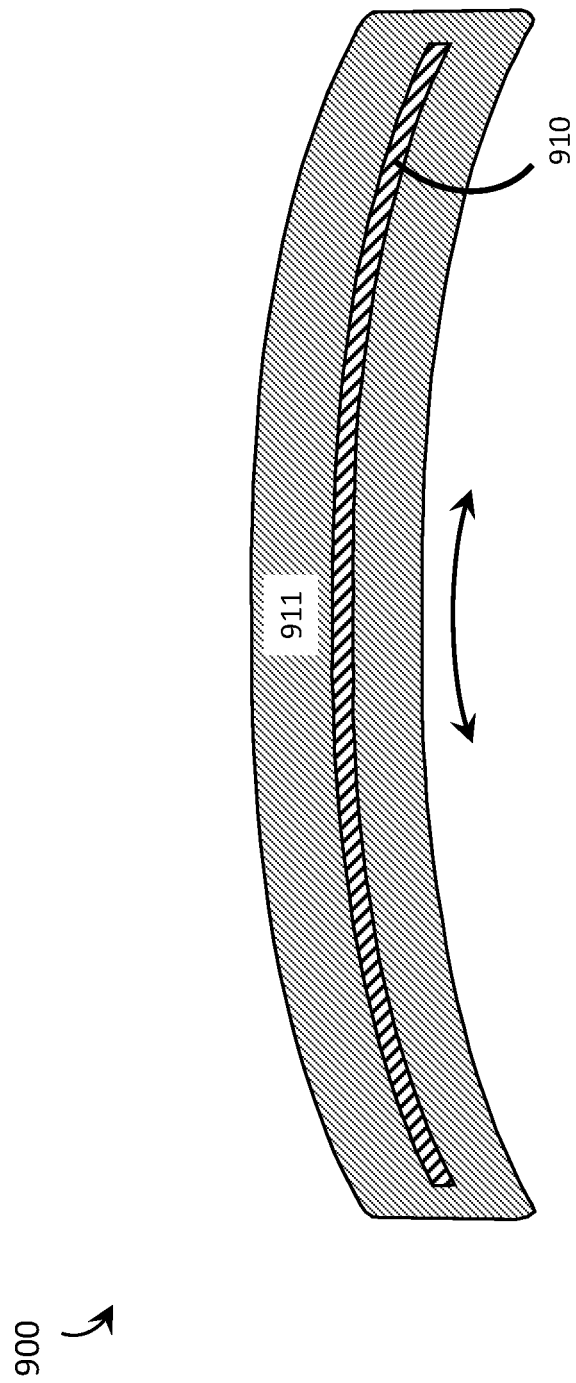
FIG. 9 is a sectional view of another exemplary curved HOE in accordance with the present systems, devices, and methods.

FIG. 9 is a sectional view of another exemplary curved HOE 900 in accordance with the present systems, devices, and methods. Curved HOE 900 includes a layer of holographic film 910 embedded within a curved volume 911 (having a first curvature emphasized by the arrows in FIG. 9) and may be prepared by any of method 100, 300, 400, 500, 600, and/or 700. In the illustrated example, curved volume 911 is an eyeglass lens and curved HOE 900 forms a transparent combiner for use in a VRD architecture as described previously. Curved HOE 900 has a total optical power $P_T$. The embedded layer of holographic film 910 includes at least one hologram having a holographic optical power $P_H$ that is less than the total optical power $P_T$ of curved HOE 900. The curvature of layer of holographic film 910 also has a geometric optical power $P_G$ that is less than the total optical power $P_T$ of curved HOE 900. The total optical power $P_T$ of curved HOE 900 includes an additive combination of the holographic optical power $P_H$ of the at least one hologram and the geometric optical power $P_G$ of the curved layer of holographic film 910 given, at least approximately, by $P_T=P_H+P_G$.

The total optical power $P_T$ of curved HOE 900 is positive and has a total focal length $f_T$. The holographic optical power $P_H$ of the at least one hologram is positive and has a first focal length $f_H$ that is greater than the total focal length $f_T$ of curved HOE 900. The geometric optical power $P_G$ of the curved layer of holographic film 910 is positive and has a second focal length $f_G$ that is greater than the total focal length $f_T$ of curved HOE 900. The total focal length $f_T$ of curved HOE 900 includes an additive reciprocal combination of the first focal length $f_H$ and the second focal length $f_G$ given, at least approximately, by $1/f_T=1/f_H+1/f_G$.

Various embodiments described herein apply stretching to a holographic film in order to induce curvature. Such stretching can alter the thickness of the holographic film which, as previously described, can impact the angular bandwidth of the hologram (i.e., the range of angles of incidence over which the hologram will play back). In accordance with the present systems, devices, and methods, it can be advantageous to accommodate the changes in thickness that may result when curvature is applied to a holographic film by starting with a planar thickness of holographic film that is different from the intended curved thickness of the holographic film so that the change in thickness brought on by the curvature will result in the desired curved thickness of the holographic film. For example, if the holographic film is going to be curved by stretching, the planar thickness of the holographic film may advantageously be larger than the intended curved thickness so that the thickness reduction that results during stretching will produce the intended curved thickness.

Figure 10:
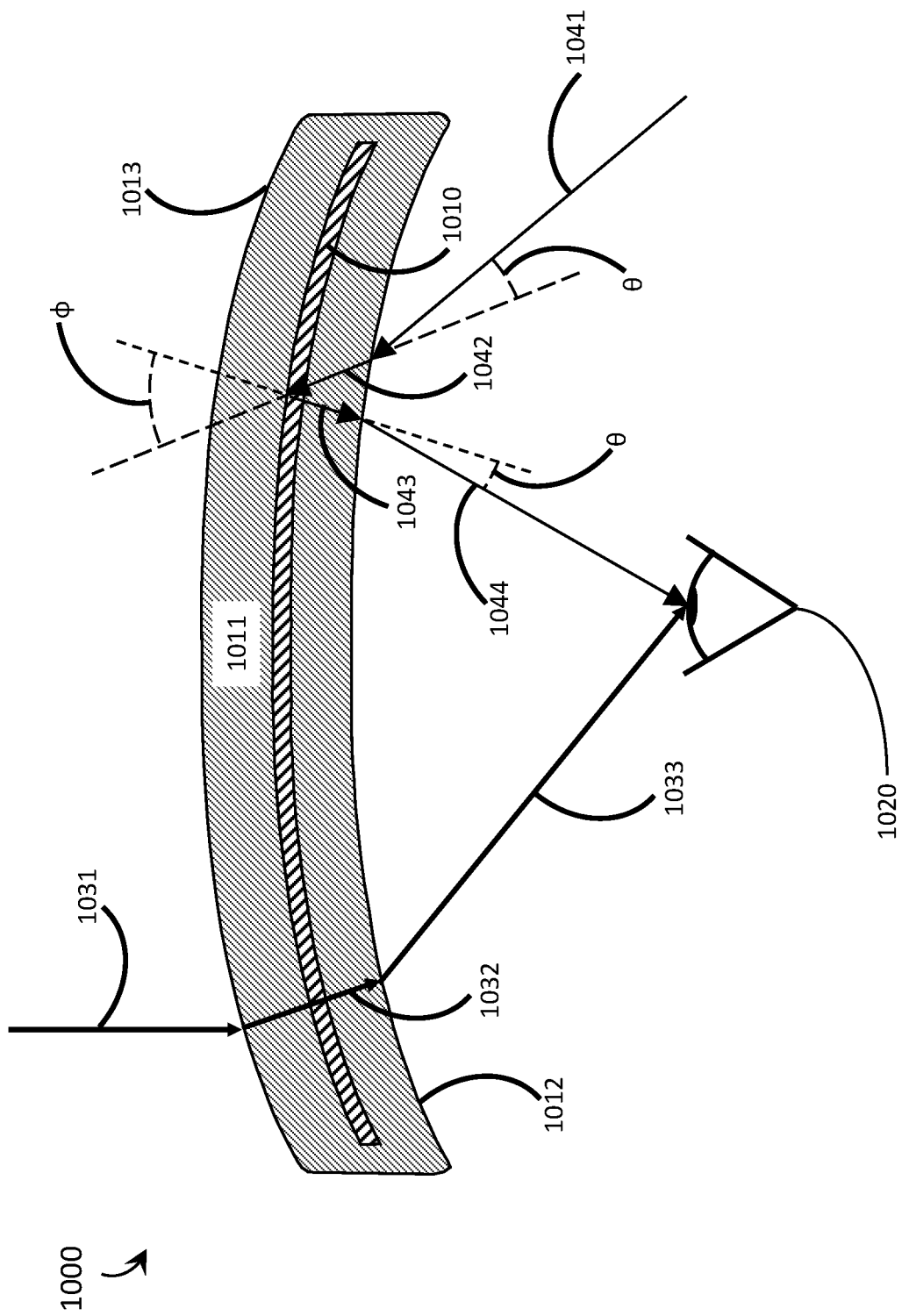
FIG. 10 is a cross-sectional view of an exemplary curved holographic optical element (HOE) suitable for use in a WHUD in accordance with the present systems, devices, and methods.

FIG. 10 is a cross-sectional view of an exemplary curved holographic optical element (HOE) 1000 suitable for use in a WHUD in accordance with the present systems, devices, and methods. Curved HOE 1000 comprises hologram 1010 and curved lens 1011. Curved HOE 1000 may comprise at least one additional hologram substantively similar to hologram 1010. Curved HOE 1000 may be substantively similar to curved HOE 900. Hologram 1010 is embedded within an internal volume of curved lens 1011. Hologram 1010 may be physically coupled to curved lens 1011 with a low-temperature optically clear adhesive (LT-OCA). Curved lens 1011 comprises target-side surface 1012 and world-side surface 1013, wherein world-side surface 1013 is opposite target-side surface 1012 across a thickness of curved lens 1011 to define an internal volume of curved lens 1011.

Throughout this specification and the appended claims, the term "playback light" refers to light which impinges upon a hologram and the portion of said light that is diffracted by said hologram. Incident playback light refers specifically to the portion of playback light that is incident upon the hologram. Incident playback angle refers to the angle of the incident playback light that satisfies the Bragg condition of the hologram. Diffracted playback light refers to the light emanating from the hologram that is diffracted by the hologram. Playback angle refers to the angle of the diffracted playback light. Playback wavelength refers to the wavelength of the incident playback light that satisfies the Bragg condition of the hologram; the light diffracted by the hologram will have the same wavelength as the light incident upon the hologram since holograms are unable to change the wavelength of light during playback, only the angle of light.

A person of skill in the art of holography will appreciate that the Bragg conditions for angle and wavelength for a hologram typically limit the light which may effectively be played back by the hologram to a small range of angles and wavelengths. Throughout this specification and the appended claims, the term "environmental light" refers to light that originates from light sources in the ambient environment of a hologram, as opposed to playback light that originates from a light source that has been positioned and oriented to provide light that may be effectively played back by the hologram. Environmental light may be incoherent and/or polychromatic. Non-exclusive sources of environmental light include direct sunlight, indirect sunlight, and overhead artificial lights. Typically, the portion of environmental light that may be played back by a hologram is negligible compared to the portion of environmental light that cannot be played back by the hologram, therefore environmental light typically passes through a hologram without any interaction with said hologram.

A person of skill in the art of optics will appreciate that while each beam of light depicted in FIG. 10 is depicted as a simple ray of light, playback light may comprise a beam of light with a cylindrical, conical, square, or more complex shape; an optical power applied to light with a cylindrical, conical, square, or more complex shape would thereby be converged and/or diverged by said optical power rather than simply being deflected as is the case for a simple ray of light.

Hologram 1010 applies a first optical power $\phi$ to a playback light. Target-side surface 1012 has a first curvature to apply a second optical power $\theta$ to the playback light. The first curvature of target-side surface 1012 is advantageous when curved HOE 1000 is employed in WHUD applications since curved lenses are more aesthetically pleasing than flat lenses. The curvature of target-side surface 1012 applies a second optical power $\theta$ to light that passes through target-side surface 1012 due to the difference in refractive index between air and the material comprising curved HOE 1000. World-side surface 1013 has a second curvature. The first optical power $\phi$ is equal in magnitude and opposite in sign to the second optical power $\theta$. Hologram 1010 may apply at least one additional holographic optical power to playback light.

A curved surface may be a cylindrically curved surface; a cylindrically curved surface is curved around an axis of curvature. A curved surface may be a spherically curved surface; a spherically curved surface is curved around a center of curvature. The center or axis of curvature, as appropriate, of target-side surface 1012 may be located at a distance of between 1 and 10 centimeters, between 10 and 50 cm, or between 50 and 1000 cm from target-side surface 1012. The center or axis of curvature, as appropriate, of world-side surface 1013 may be located at a distance of between 1 and 10 centimeters, between 10 and 50 cm, or between 50 and 1000 cm from world-side surface 1013.

Hologram 1010 may be played back by illuminating curved HOE 1000 with incident playback light 1041. Upon reaching target-side surface 1012, the second optical power $\theta$ is applied to incident playback light 1041; the resulting change in angle and/or convergence and/or divergence converts incident playback light 1041 into incident playback light 1042. At least a portion of incident playback light 1042 is then diffracted by hologram 1010 to form diffracted playback light 1043 if incident playback light 1042 satisfies the Bragg conditions for angle and wavelength for hologram 1010. A person of skill in the art of optics will appreciate that incident playback light 1041 may not satisfy the Bragg condition for angle for hologram 1010, however the difference in angle between incident playback light 1041 and incident playback light 1042 due to the second optical power $\theta$ may allow incident playback light 1042 to still satisfy the Bragg condition for angle for hologram 1010.

Environmental light 1031 originates in the environment on the world-side of curved HOE 1000. Upon reaching world-side surface 1013, a third optical power may be applied to environmental light 1031, converting environmental light 1031 to environmental light 1032. Upon reaching target-side surface 1012, the second optical power $\theta$ may be applied to environmental light 1032, converting environmental light 1032 to environmental light 1033. Environmental light 1033 has an angle that causes environmental light 1033 to reach target area 1020. The second optical power $\theta$ applied to environmental light 1031 may have a magnitude of zero, and the third optical power applied to environmental light 1031 may have a magnitude of zero.

Upon reaching target-side surface 1012, the second optical power $\theta$ is applied to diffracted playback light 1043; the resulting change in angle and/or convergence and/or divergence converts diffracted playback light 1043 into diffracted playback light 1044. Diffracted playback light 1044 then reaches target area 1020. A person of skill in the art of optics will appreciate that diffracted playback light 1043 may have an angle that would result in diffracted playback light reaching target area 1020, however the difference in angle between diffracted playback light 1043 and diffracted playback light 1044 due to the second optical power $\theta$ may allow diffracted playback light 1044 to still reach target area 1020. Hologram 1010 may comprise an incident playback angle, a playback angle, and a playback wavelength. Hologram 1010 may diffract diffracted playback light 1043 and/or diffracted playback light 1044 towards target area 1020.

The first optical power $\phi$ may comprise a first holographic optical power. A holographic optical power comprises an optical power with a magnitude and a sign that is only applied to playback light and not to environmental light, since playback light satisfies the Bragg conditions for hologram 1010 and environmental light does not satisfy the Bragg condition for hologram 1010.

Hologram 1010 may comprise at least one hologram to apply a first holographic optical power to a diffracted playback light. The second optical power $\theta$ may comprise a first refractive optical power. First curvature 1012 may comprise a first curvature to apply a first refractive optical power to diffracted playback light 1043. First curvature 1012 may comprise a first curvature to apply a second refractive optical power to incident playback light 1041. Hologram 1010 may comprise a hologram to apply a second holographic optical power to incident playback light 1042, wherein the second holographic optical power is equal in magnitude and opposite in sign to the second refractive optical power. The first optical power $\phi$ may be negative and the second optical power $\theta$ may be positive; conversely the first optical power $\phi$ may be positive and the second optical power $\theta$ may be negative. Applying two optical powers equal in magnitude and opposite in sign provides no net optical power, i.e. one optical power has compensated for the other optical power.

The combination of the first curvature and the second curvature may not apply a net optical power to environmental light 1031 and/or environmental light 1032 passing through HOE 1000 to the target area 1020. The first curvature and the second curvature may comprise a set of concentrically spherically curved surfaces. Concentrically spherically curved surfaces do not apply a net optical power to light passing through said surfaces to the center of curvature of said concentrically spherically curved surfaces.

Curved lens 1011 may comprise an eyeglass lens and target area 1020 may comprise an eye of a user, in which case curved HOE 1000 is advantageously able to be used in a WHUD. Curved lens 1011 may comprise a prescription eyeglass lens. A prescription eyeglass lens typically has a strongest curvature on the target-side surface resulting in a higher magnitude of the second optical power θ relative to a non-prescription eyeglass lens, however the first optical power ϕ may still be equal in magnitude and opposite in sign to the second optical power θ for a prescription eyeglass lens. Target-side surface 1012 may have an aspheric curvature, where an aspheric curvature causes the first optical power ϕ to vary across target-side surface 1012. The second optical power θ may vary across eye-side surface 1012 to achieve a second optical power θ across hologram 1010 that is equal in magnitude and opposite in sign to the first refractive optical power across hologram 1010.

Hologram 1010 may comprise an infrared hologram; infrared holograms may be employed advantageously for eye-tracking in addition to other applications. Hologram 1010 may comprise a red hologram, a green hologram, and a blue hologram, allowing curved HOE 1000 to be employed in a WHUD with a full-color (RGB) display.

Figure 11:
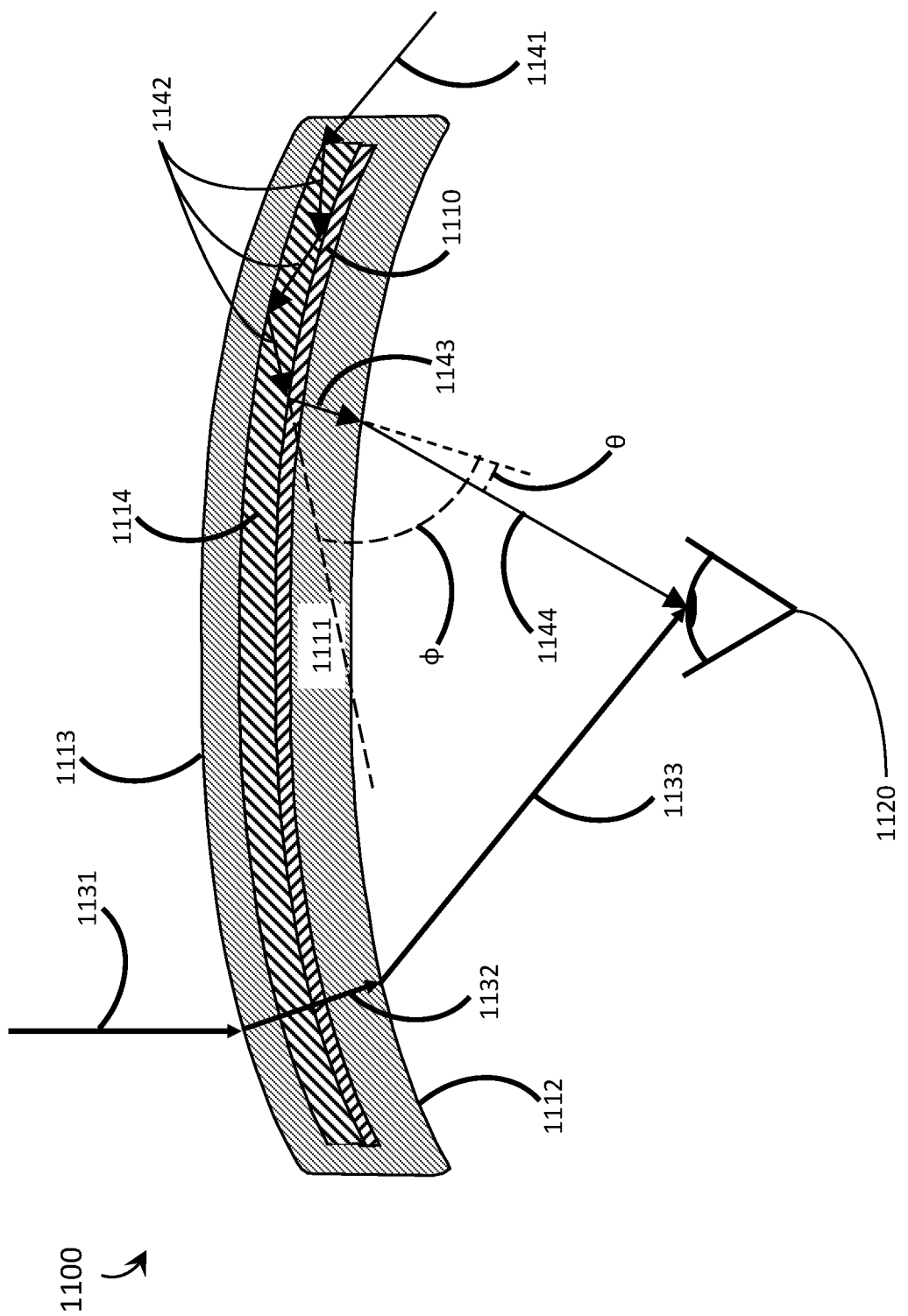
FIG. 11 is a cross-sectional view of an exemplary curved HOE suitable for use in a WHUD in accordance with the present systems, devices, and methods.

FIG. 11 is a cross-sectional view of an exemplary curved HOE 1100 suitable for use in a WHUD in accordance with the present systems, devices, and methods. Curved HOE 1100 comprises hologram 1110, curved lens 1111, and light guide 1114. Curved HOE 1100 may comprise at least one additional hologram substantively similar to hologram 1110. Curved HOE 1100 may be substantively similar to curved HOE 900. Curved HOE 1100 may be substantively similar to curved HOE 1000. Hologram 1110 is embedded within an internal volume of lens 1111. Hologram 1110 may be physically coupled to curved lens 1111 with a low-temperature optically clear adhesive (LT-OCA). Curved lens 1111 comprises target-side surface 1112 and world-side surface 1113, wherein world-side surface 1113 is opposite target-side surface 1112 across a thickness of curved lens 1111 to define an internal volume of curved lens 1111. Target-side surface 1112 has a first curvature. World-side surface 1113 has a second curvature. The center or axis of curvature, as appropriate, of target-side surface 1112 may be located at a distance of between 1 and 10 centimeters, between 10 and 50 cm, or between 50 and 1000 cm from target-side surface 1112. The center or axis of curvature, as appropriate, of world-side surface 1113 may be located at a distance of between 1 and 10 centimeters, between 10 and 50 cm, or between 50 and 1000 cm from world-side surface 1113.

Hologram 1110 applies a first optical power ϕ to a playback light. Hologram 1110 may apply at least one additional holographic optical power to playback light. Target-side surface 1112 has a first curvature to apply a second optical power θ to the playback light. The first optical power ϕ is equal in magnitude and opposite in sign to the second optical power θ. Hologram 1110 comprises a holographic outcoupler. Light guide 1114 is embedded within an internal volume of curved lens 1111. Light guide 1114 is optically coupled to hologram 1110 to route playback light through light guide 1114 to hologram 1110. Hologram 1110 applies a first optical power ϕ to a playback light. Target-side surface 1112 has a first curvature to apply a second optical power θ to the playback light.

Hologram 1110 may be played back by illuminating curved HOE 1100 with incident playback light 1141. Hologram 1110 may comprise an incident playback angle, a playback angle, and a playback wavelength. Hologram 1110 may diffract diffracted playback light 1143 and/or diffracted playback light 1144 towards target area 1120. Incident playback light 1141 enters curved HOE 1100 without passing through either target-side surface 1112 or world-side surface 1113, therefore neither the curvature of target-side surface 1112 nor the curvature of world-side surface 1113 apply an optical power to incident playback light 1141 as incident playback light enters curved HOE 1100. Incident playback light 1141 enters light guide 1114, converting incident playback light 1141 to guided incident playback light 1142; light guide 1114 guides guided incident playback light 1142 to hologram 1110. At least a portion of guided incident playback light 1142 is then diffracted by hologram 1110 to form diffracted playback light 1143 if incident playback light 1142 satisfies the Bragg conditions for angle and wavelength for hologram 1110.

Upon reaching target-side surface 1112, the second optical power θ is applied to diffracted playback light 1143; the resulting change in angle and/or convergence and/or divergence converts diffracted playback light 1143 into diffracted playback light 1144. Diffracted playback light 1144 then reaches target area 1120. Environmental light 1131 passes through curved HOE 1100 to form environmental light 1132 and environmental light 1133 in a manner substantively similar to the passage of environmental light 1031 through curved HOE 1000, with the exception that environmental light 1132 may also pass through light guide 1114 without any significant optical power being applied to environmental light 1132.

Hologram 1110 may comprise an exit pupil replicator positioned and oriented to replicate a first set of exit pupils, wherein each exit pupil of the first set of exit pupils is replicated into a respective first subset of at least two exit pupils, each first subset of exit pupils is oriented in a first dimension, and wherein the first set of exit pupils comprises at least one exit pupil. Replication of exit pupils is advantageous since small exit pupils are advantageous when curved HOE 1100 is employed in a WHUD since a small exit pupil allows the entire exit pupil to be located entirely within target area 1120. However, a single small exit pupil cannot reliably cover the entirety of target area 1120 and also be located entirely within target area 1120 due to small errors in the sizing and positioning of a single small exit pupil. Exit pupil replication allows a single small exit pupil to be replicated and spread across target area 1120 to achieve full coverage of target area 1120 with exit pupils.

Curved HOE 1100 may further comprise at least one additional hologram, wherein each additional hologram is substantively similar to hologram 1110, and wherein at least one of the at least one additional holograms comprises a second exit pupil replicator positioned and oriented to replicate a second set of exit pupils, wherein each exit pupil of the second set of exit pupils is replicated into a respective second subset of at least two exit pupils, each second subset of exit pupils is oriented in a second dimension, and wherein the second set of exit pupils comprises at least one exit pupil. Replication of exit pupils with two exit pupil replicators, where each exit pupil replicator replicates exit pupils in a dimension orthogonal to the other exit pupil replicator, allows replication of exit pupils across a two-dimensional are that more easily entirely covers target area 1120 with exit pupils.

Figure 12:
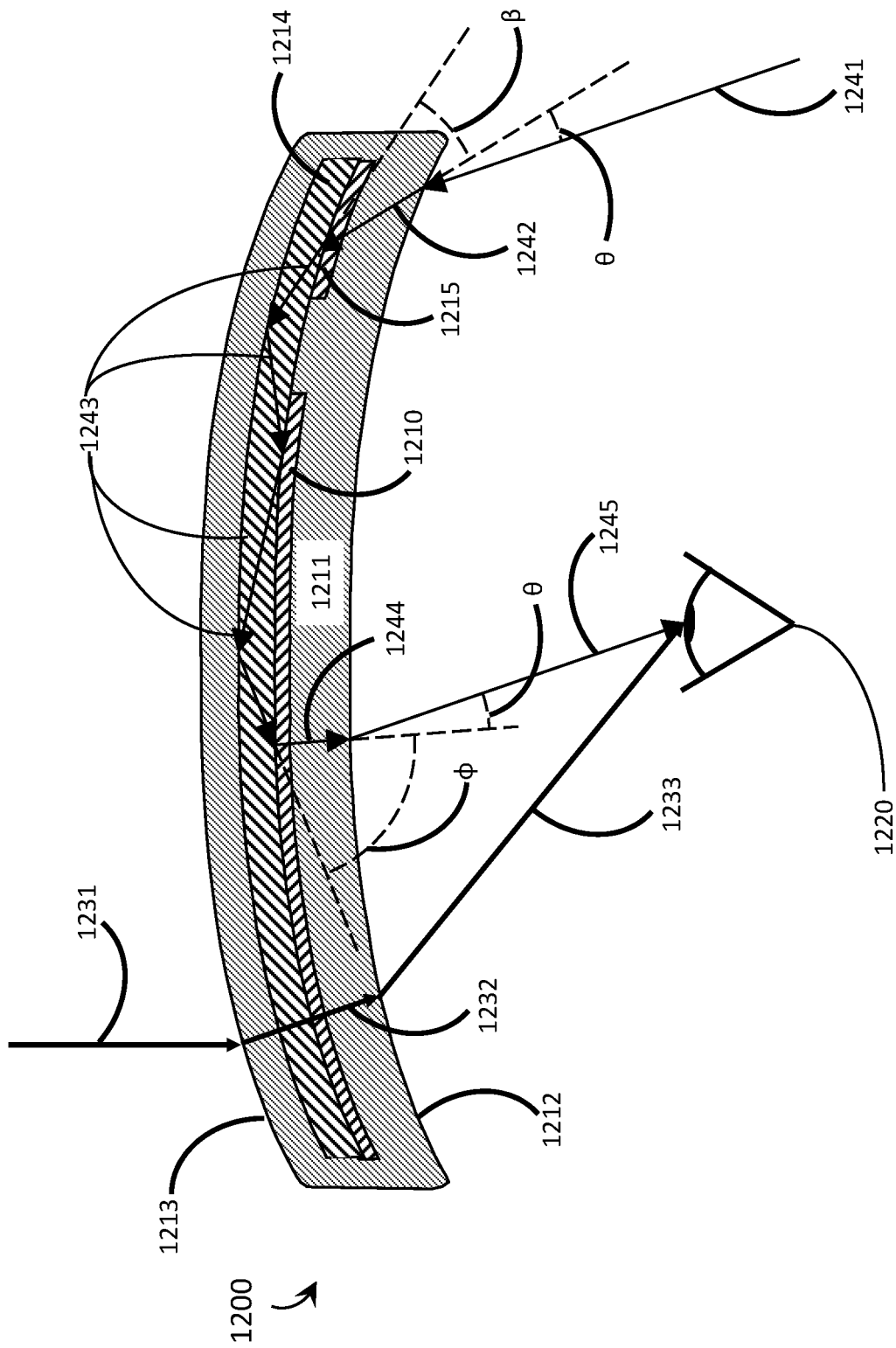
FIG. 12 is a cross-sectional view of an exemplary curved HOE suitable for use in a WHUD in accordance with the present systems, devices, and methods.

FIG. 12 is a cross-sectional view of an exemplary curved HOE 1200 suitable for use in a WHUD in accordance with the present systems, devices, and methods. Curved HOE 1200 comprises hologram 1210, curved lens 1211, light guide 1214, and additional hologram 1215. Curved HOE 1200 may comprise at least one additional hologram substantively similar to hologram 1210. Curved HOE 1200 may be substantively similar to curved HOE 900. Curved HOE 1200 may be substantively similar to curved HOE 1000.

Curved HOE 1200 may be substantively similar to curved HOE 1100. Hologram 1210 is embedded within an internal volume of lens 1211. Additional hologram 1215 is embedded within an internal volume of lens 1211. Hologram 1210 may be physically coupled to curved lens 1211 with a low-temperature optically clear adhesive (LT-OCA). Curved lens 1211 comprises target-side surface 1212 and world-side surface 1213, wherein world-side surface 1213 is opposite target-side surface 1212 across a thickness of curved lens 1211 to define an internal volume of curved lens 1211. Target-side surface 1212 has a first curvature. World-side surface 1213 has a second curvature.

The center or axis of curvature, as appropriate, of target-side surface 1212 may be located at a distance of between 1 and 10 centimeters, between 10 and 50 cm, or between 50 and 1000 cm from target-side surface 1212. The center or axis of curvature, as appropriate, of world-side surface 1213 may be located at a distance of between 1 and 10 centimeters, between 10 and 50 cm, or between 50 and 1000 cm from world-side surface 1213. Hologram 1210 applies a first optical power $\phi$ to a playback light. Target-side surface 1212 has a first curvature to apply a second optical power $\theta$ to the playback light. The first optical power $\phi$ is equal in magnitude and opposite in sign to the second optical power $\theta$.

Hologram 1210 comprises a holographic outcoupler. Hologram 1215 comprises a holographic incoupler. Light guide 1214 is embedded within an internal volume of curved lens 1211. Light guide 1214 is optically coupled to hologram 1210 and hologram 1215 to route playback light from hologram 1215 through light guide 1214 to hologram 1210. Hologram 1210 applies a first optical power $\phi$ to a playback light. Hologram 1210 may apply at least one additional holographic optical power to playback light. Hologram 1215 applies a third optical power $\beta$ to the playback light. Hologram 1215 may apply at least one additional holographic optical power to playback light. Target-side surface 1212 has a first curvature to apply a second optical power $\theta$ to the playback light.

Hologram 1210 may be played back by illuminating curved HOE 1200 with incident playback light 1241. Upon reaching target-side surface 1212, the second optical power $\theta$ is applied to incident playback light 1241; the resulting change in angle and/or convergence and/or divergence converts incident playback light 1241 into incident playback light 1242. At least a portion of incident playback light 1242 is then diffracted by hologram 1215 to enter light guide 1114 and form guided playback light 1243 if incident playback light 1242 satisfies the Bragg conditions for angle and wavelength for hologram 1215. Hologram 1215 applies a third optical power $\beta$ to guided light 1243. Light guide 1214 guides guided incident playback light 1243 to hologram 1210. At least a portion of guided incident playback light 1243 is then diffracted by hologram 1210 to form diffracted playback light 1244 if guided playback light 1243 satisfies the Bragg conditions for angle and wavelength for hologram 1210.

Upon reaching target-side surface 1212, the second optical power $\theta$ is applied to diffracted playback light 1244; the resulting change in angle and/or convergence and/or divergence converts diffracted playback light 1244 into diffracted playback light 1245. Diffracted playback light 1245 then reaches target area 1220. Environmental light 1231 passes through curved HOE 1200 to form environmental light 1232 and environmental light 1233 in a manner substantively similar to the passage of environmental light 1031 through curved HOE 1000, with the exception that environmental light 1232 may also pass through light guide 1214 without any significant optical power being applied to environmental light 1232. Hologram 1210 may comprise an incident playback angle, a playback angle, and a playback wavelength. Hologram 1210 may diffract diffracted playback light 1244 and/or diffracted playback light 1245 towards target area 1220.

The curvature of first surface 1212 may apply a second refractive optical power to incident playback light 1241. Hologram 1215 may apply a second holographic optical power to incident playback light 1242, wherein the second holographic optical power is equal in magnitude and opposite in sign to the second refractive optical power.

Figure 13:
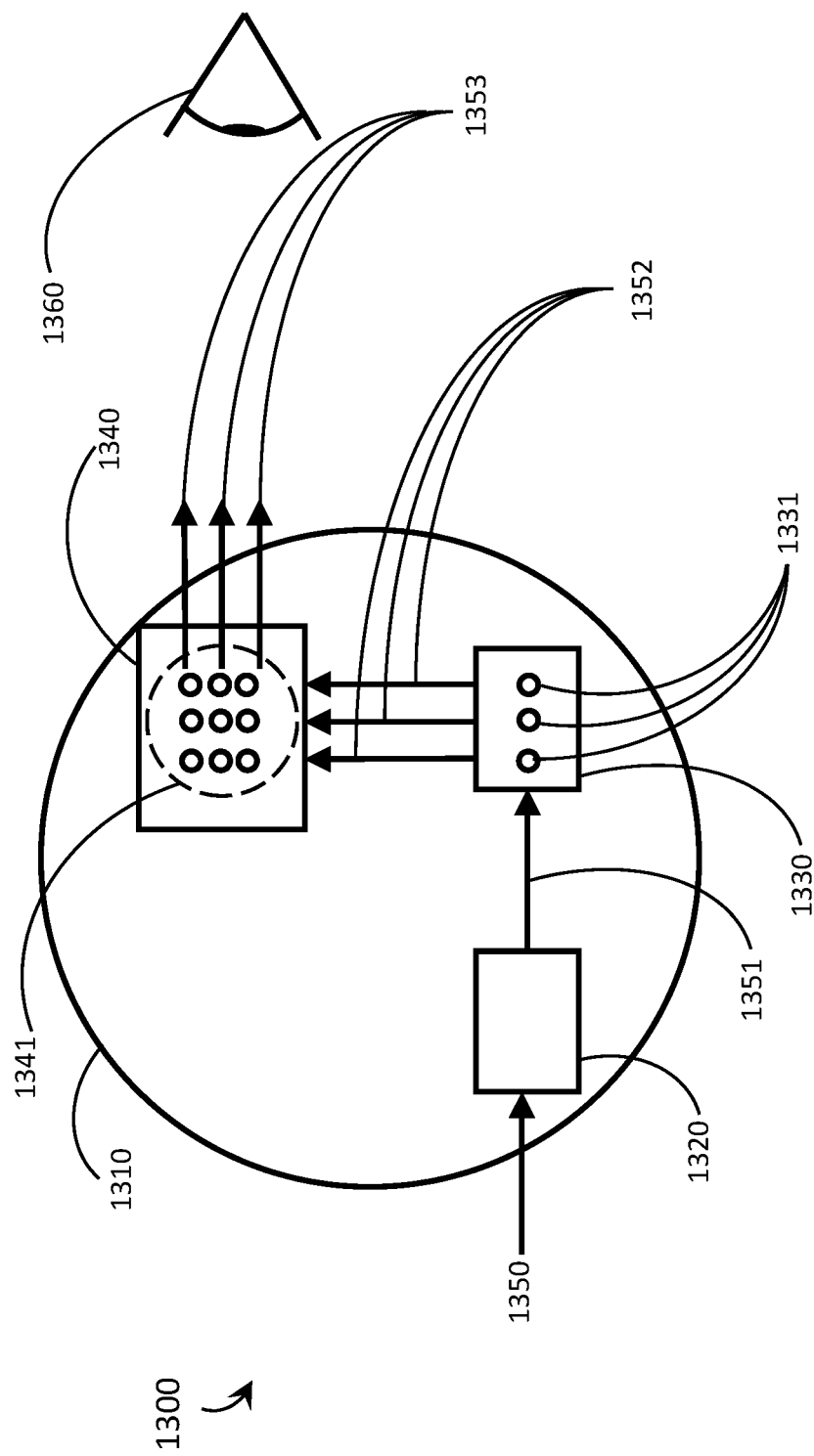
FIG. 13 is a front elevational view of an exemplary curved HOE suitable for use in a WHUD in accordance with the present systems, devices, and methods.

FIG. 13 is a front elevational view of an exemplary curved HOE 1300 suitable for use in a WHUD in accordance with the present systems, devices, and methods. Curved HOE 1300 comprises curved lens 1310, first hologram 1320, second hologram 1332 and third hologram 1340. Curved HOE 1300 may be substantively similar to curved HOE 900, curved HOE 1000, curved HOE 1100, and curved HOE 1200. Curved lens 1310 comprises a light guide.

First hologram 1320 comprises a holographic incoupler that diffracts incident light 1350 into curved lens 1310, converting incident light 1350 into guided 1351. Incident light 1350 and guided light 1351 each comprise at least one exit pupil. Curved lens 1310 routes guided light 1351 to second hologram 1330. Second hologram 1330 comprises a first exit pupil replicator. Second hologram 1330 replicates the at least one exit pupil of guided light 1351 to form first set of exit pupils 1331. First set of exit pupils 1331 comprises at least one first sub-set of exit pupils, wherein each first sub-set of exit pupils is oriented in a first dimension. Second hologram 1330 also redirects first set of exit pupils into curved lens 1310. Curved lens 1310 routes first set of exit pupils 1331 to third hologram 1340.

Third hologram 1340 comprises a second exit pupil replicator. Third hologram 1330 replicates first set of exit pupils 1331 to form second set of exit pupils 1341. Second set of exit pupils 1341 comprises at least one second sub-set of exit pupils, wherein each second sub-set of exit pupils is oriented in a second dimension. Third hologram 1340 comprises a holographic outcoupler. Third hologram 1340 outcouples each exit pupil comprising second set of exit pupils 1341 towards target area 1360.

Figure 14:
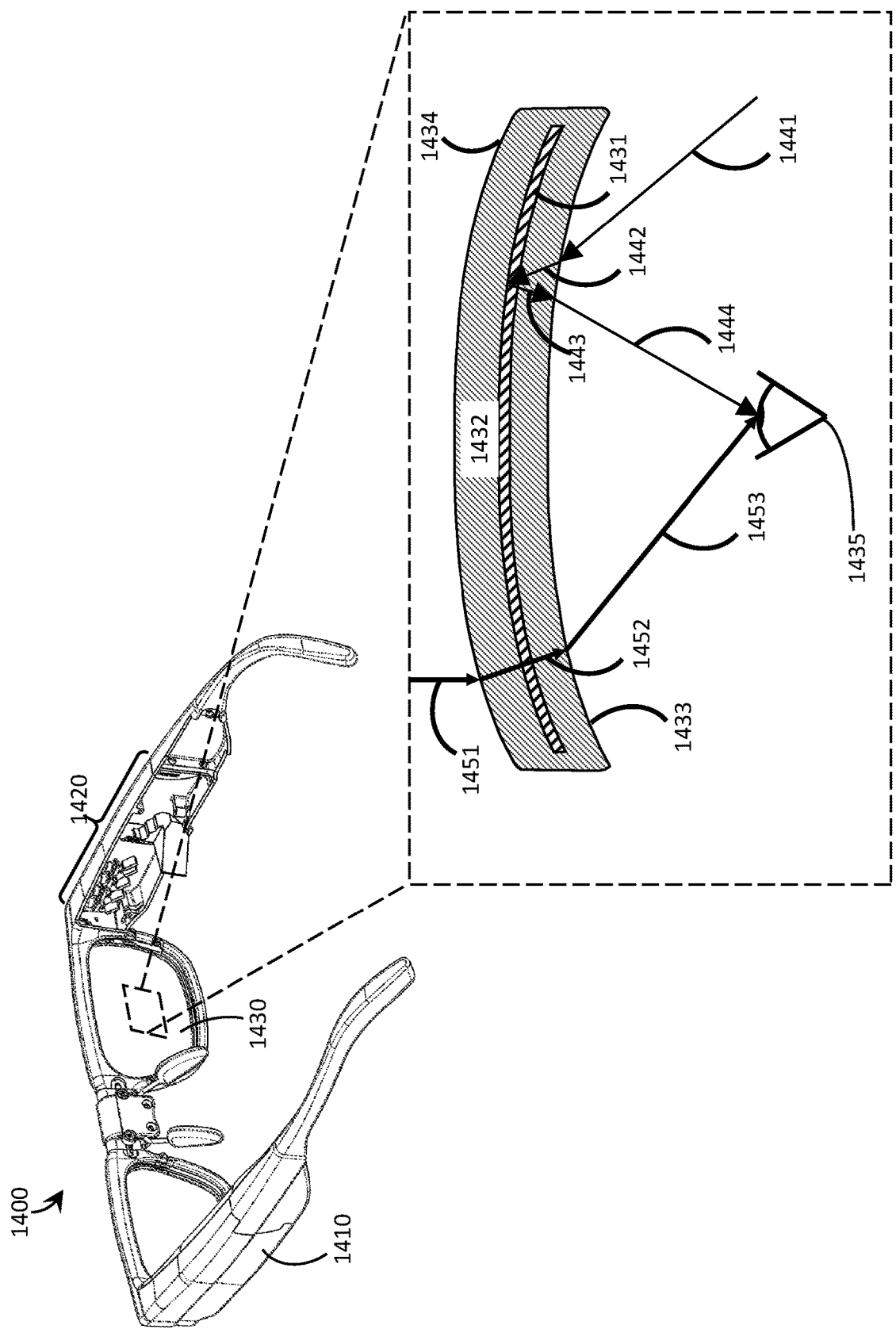
FIG. 14 is a partial-cutaway perspective view of a WHUD that includes an eyeglass lens with an embedded hologram in accordance with the present systems, devices, and methods.

FIG. 14 is a partial-cutaway perspective view of a WHUD 1400 that includes an eyeglass lens 1430 with an embedded hologram 1431 in accordance with the present systems, devices, and methods. Eyeglass lens 1430 may be substantively similar to curved HOE 900. Eyeglass lens 1430 may be substantively similar to curved HOE 1000. Eyeglass lens 1430 may be substantively similar to curved HOE 1100. Eyeglass lens 1430 may be substantively similar to curved HOE 1200. WHUD 1400 comprises a support structure 1410 that is worn on the head of the user and has a general shape and appearance of an eyeglasses (e.g., sunglasses) frame. Support structure 1410 carries multiple components, including: an image source 1420, and an eyeglass lens 1430. Image source 1420 is positioned and oriented to direct light towards the eyeglass lens and may include, for example, a micro-display system, a scanning laser projection system, or another system for generating display images. FIG. 14 provides a partial-cutaway view in which regions of support structure 1410 have been removed in order to render visible portions of image source 1420 and clarify the location of image source 1420 within WHUD 1400. Eyeglass lens 1430 is positioned within a field of view of an eye of the user when the support structure is worn on the head of the user and serves as both a conventional eyeglass lens (i.e., prescription or non-prescription depending on the needs of the user) and a transparent combiner.

Eyeglass lens 1430 comprises hologram 1431 and curved lens 1432. Eyeglass lens 1430 may comprise at least one additional hologram substantively similar to hologram 1431. Hologram 1431 is embedded within an internal volume of eyeglass lens 1430. Eyeglass lens 1430 comprises target-side surface 1433 and world-side surface 1434, wherein world-side surface 1434 is opposite target-side surface 1433 across a thickness of eyeglass lens 1430 to define an internal volume of eyeglass lens 1430. Target-side surface 1433 has a first curvature. World-side surface 1434 has a second curvature. The center or axis of curvature, as appropriate, of target-side surface 1433 may be located at a distance of between 1 and 10 centimeters, between 10 and 50 cm, or between 50 and 1000 cm from target-side surface 1433. The center or axis of curvature, as appropriate, of world-side surface 1434 may be located at a distance of between 1 and 10 centimeters, between 10 and 50 cm, or between 50 and 1000 cm from world-side surface 1434.

Hologram 1431 applies a first optical power to a playback light. Hologram 1431 may apply at least one additional holographic optical power to playback light. Target-side surface 1433 has a first curvature to apply a second optical power to the playback light. The first optical power is equal in magnitude and opposite in sign to the second optical power. Hologram 1431 may be played back by illuminating eyeglass lens 1430 with incident playback light 1441. Upon reaching target-side surface 1433, the second optical power is applied to incident playback light 1441; the resulting change in angle and/or convergence and/or divergence converts incident playback light 1441 into incident playback light 1442. At least a portion of incident playback light 1442 is then diffracted to form diffracted playback light 1443 by hologram 1431 towards target-side surface 1433 if incident playback light 1442 satisfies the Bragg conditions for angle and wavelength for hologram 1431.

Upon reaching target-side surface 1433, the second optical power is applied to diffracted playback light 1443; the resulting change in angle and/or convergence and/or divergence converts diffracted playback light 1443 into diffracted playback light 1444. Diffracted playback light 1444 then reaches target area 1435. Environmental light 1451 passes through eyeglass lens 1430 to form environmental light 1452 and environmental light 1452 in a manner substantively similar to the passage of environmental light 1031 through curved HOE 1000.

Hologram 1431 may comprise an incident playback angle, a playback angle, and a playback wavelength. Hologram 1431 may diffract diffracted playback light 1443 and/or diffracted playback light 1444 towards target area 1435.

The first optical power may comprise a first holographic optical power. The second optical power may comprise a first refractive optical power. First curvature 1433 may comprise a first curvature to apply a first refractive optical power to diffracted playback light 1443. First curvature 1433 may comprise a first curvature to apply a second refractive optical power to incident playback light 1441. Hologram 1431 may comprise a hologram to apply a second holographic optical power to incident playback light 1442, wherein the second holographic optical power is equal in magnitude and opposite in sign to the second refractive optical power. The first optical power may be negative and the second optical power may be positive; conversely the first optical power may be positive and the second optical power may be negative.

The combination of the first curvature and the second curvature may not apply a net optical power to environmental light 1451 and/or environmental light 1452 passing through eyeglass lens 1430 to the target area 1435. The first curvature and the second curvature may comprise a set of concentrically spherically curved surfaces.

Target area 1435 may comprise an eye of a user. Eyeglass lens 1430 may comprise a prescription eyeglass lens. Target-side surface 1433 may have an aspheric curvature, where an aspheric curvature causes the first optical power to vary across target-side surface 1433. The second optical power may vary across target-side surface 1433 to achieve a second optical power across hologram 1431 that is equal in magnitude and opposite in sign to the first refractive optical power across hologram 1431.

Hologram 1431 may comprise an infrared hologram. Hologram 1010 may comprise a red hologram, a green hologram, and a blue hologram, allowing curved HOE 1000 to be employed in a WHUD with a full-color (RGB) display.

Hologram 1431 may comprise a holographic outcoupler. Eyeglass lens 1430 may further comprise a curved light guide optically coupled to hologram 1431 to route playback light through the light guide to the holographic outcoupler. Hologram 1431 may comprise an exit pupil replicator positioned and oriented to replicate a first set of exit pupils, wherein each exit pupil of the first set of exit pupils is replicated into a respective first subset of at least two exit pupils, each first subset of exit pupils is oriented in a first dimension, and wherein the first set of exit pupils comprises at least one exit pupil.

Eyeglass lens 1430 may further comprise at least one additional hologram, wherein each additional hologram is substantively similar to hologram 1431, and wherein at least one of the at least one additional holograms comprises a second exit pupil replicator positioned and oriented to replicate a second set of exit pupils, wherein each exit pupil of the second set of exit pupils is replicated into a respective second subset of at least two exit pupils, each second subset of exit pupils is oriented in a second dimension, and wherein the second set of exit pupils comprises at least one exit pupil.

The curvature of first surface 1433 may apply a second refractive optical power to incident playback light 1441. Hologram 1431 may apply a second holographic optical power to incident playback light 1442, wherein the second optical power is equal in magnitude and opposite in sign to the second refractive optical power.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. patent application Ser. No. 15/381,883, U.S. Provisional Patent Application Ser. No. 62/268,892, U.S. Provisional Patent Application Ser. No. 62/242,844 (now U.S. Non-Provisional patent application Ser. No. 15/147,638), U.S. Provisional Patent Application Ser. No. 62/156,736 (now U.S. Non-Provisional patent application Ser. No. 15/145,576, US Patent Application Publication No. 2016-0327797, and US Patent Application Publication No. 2016-0327796), U.S. Provisional Patent Application Ser. No. 62/117,316 (now U.S. Non-Provisional patent application Ser. No. 15/046,234, U.S. Non-Provisional patent application Ser. No. 15/046,254, and US Patent Application Publication No. 2016-0238845), and U.S. Provisional Patent Application Ser. No. 62/214,600 (now U.S. Non-Provisional patent application Ser. No. 15/256,148), are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A curved holographic optical element (HOE) for use in a wearable heads-up display, the curved HOE comprising: at least one hologram to apply a first optical power to a playback light; a curved lens, wherein the curved lens comprises: a target-side surface having a first curvature, the first curvature to apply a second optical power to the playback light; and a world-side surface having a second curvature, the world-side surface opposite the target-side surface across a thickness of the curved lens to define an internal volume of the curved lens; wherein the at least one hologram is embedded within the internal volume of the curved lens, and wherein the first optical power is equal in magnitude and opposite in sign to the second optical power, wherein the curved HOE further comprises a curved light guide, wherein the at least one hologram comprises a holographic outcoupler, and wherein the curved light guide is optically coupled to the holographic outcoupler to route playback light through the light guide to the holographic outcoupler.

2. The curved HOE of claim 1 wherein the holographic outcoupler comprises a first exit pupil replicator positioned and oriented to replicate a first set of exit pupils, wherein each exit pupil of the first set of exit pupils is replicated into a respective first subset of at least two exit pupils, each first subset of exit pupils is oriented in a first dimension, and wherein the first set of exit pupils comprises at least one exit pupil.

3. The curved HOE of claim 2, further comprising a second exit pupil replicator positioned and oriented to replicate a second set of exit pupils, wherein each exit pupil of the second set of exit pupils is replicated into a respective second subset of at least two exit pupils, each second subset of exit pupils is oriented in a second dimension, and wherein the second set of exit pupils comprises at least one exit pupil.

4. The curved HOE of claim 1 wherein the first curvature applies a second refractive optical power to an incident playback light; and wherein the curved HOE of claim 1 further comprises a holographic incoupler, the holographic incoupler comprising at least one hologram to apply a second holographic optical power to the incident playback light, wherein the second holographic optical power is equal in magnitude and opposite in sign to the second refractive optical power.

5. A wearable heads-up display (WHUD) comprising:
a support structure;
a projector; and
a curved holographic optical element (HOE) positioned and oriented to appear in a field of view of an eye of a user when the support structure is worn on a head of the user, the curved HOE comprising:
at least one hologram to apply a first optical power to a playback light;
a curved lens, wherein the curved lens comprises:
a target-side surface having a first curvature, the first curvature to apply a second optical power to the playback light; and
a world-side surface having a second curvature, the world-side surface opposite the target-side surface across a thickness of the curved lens to define an internal volume of the curved lens;
wherein the at least one hologram is embedded within the internal volume of the curved lens, and wherein the first optical power is equal in magnitude and opposite in sign to the second optical power, wherein the WHUD further comprises a curved light guide, wherein the at least one hologram comprises a holographic outcoupler, and wherein the curved light guide is optically coupled to the holographic outcoupler to route playback light through the light guide to the holographic outcoupler.

6. The WHUD of claim 5 wherein the holographic outcoupler comprises a first exit pupil replicator positioned and oriented to replicate a first set of exit pupils, wherein each exit pupil of the first set of exit pupils is replicated into a respective first subset of at least two exit pupils, each first subset of exit pupils is oriented in a first dimension, and wherein the first set of exit pupils comprises at least one exit pupil.

7. The WHUD of claim 6, further comprising a second exit pupil replicator positioned and oriented to replicate a second set of exit pupils, wherein each exit pupil of the second set of exit pupils is replicated into a respective second subset of at least two exit pupils, each second subset of exit pupils is oriented in a second dimension, and wherein the second set of exit pupils comprises at least one exit pupil.

8. The WHUD of claim 5 wherein the first curvature applies a second refractive optical power to an incident playback light; and wherein the WHUD of claim 5 further comprises a holographic incoupler, the holographic incoupler comprising at least one hologram to apply a second holographic optical power to the incident playback light, wherein the second holographic optical power is equal in magnitude and opposite in sign to the second refractive optical power.

* * * * *